(12) United States Patent
Odom

(10) Patent No.: US 8,590,167 B2
(45) Date of Patent: Nov. 26, 2013

(54) VEHICLE GUIDANCE SYSTEM AND METHOD

(76) Inventor: Kyle L. Odom, Happy, TX (US)

( * ) Notice: Subject to any disclaimer, the term of this patent is extended or adjusted under 35 U.S.C. 154(b) by 267 days.

(21) Appl. No.: 13/130,290

(22) PCT Filed: Nov. 16, 2009

(86) PCT No.: PCT/US2009/064635
§ 371 (c)(1),
(2), (4) Date: May 19, 2011

(87) PCT Pub. No.: WO2010/059570
PCT Pub. Date: May 27, 2010

(65) Prior Publication Data
US 2011/0219632 A1   Sep. 15, 2011

Related U.S. Application Data

(60) Provisional application No. 61/116,184, filed on Nov. 19, 2008.

(51) Int. Cl.
*G01B 1/00* (2006.01)
*G01B 11/00* (2006.01)

(52) U.S. Cl.
USPC .............................................. 33/228; 33/264

(58) Field of Classification Search
USPC ..................................... 33/264, 286
See application file for complete search history.

(56) References Cited

U.S. PATENT DOCUMENTS

| | | | | |
|---|---|---|---|---|
| 4,941,263 | A * | 7/1990 | Hirshberg | 33/264 |
| 5,285,205 | A * | 2/1994 | White | 33/264 |
| 6,501,536 | B1 * | 12/2002 | Fredricks | 33/228 |
| 6,688,007 | B2 * | 2/2004 | Ferron | 33/264 |
| 6,772,525 | B2 * | 8/2004 | Newcomer | 33/286 |
| 7,043,342 | B1 * | 5/2006 | Dewees | 33/286 |
| 7,354,057 | B2 * | 4/2008 | Milner et al. | 33/264 |
| 7,467,473 | B2 * | 12/2008 | Harrill et al. | 33/264 |
| 2003/0079355 | A1 * | 5/2003 | Ferron | 33/264 |
| 2007/0235969 | A1 * | 10/2007 | Harrill et al. | 33/264 |
| 2011/0219632 | A1 * | 9/2011 | Odom | 33/228 |

* cited by examiner

*Primary Examiner* — Yaritza Guadalupe-McCall
(74) *Attorney, Agent, or Firm* — Patton Boggs LLP

(57) ABSTRACT

In one embodiment, a method for aligning a vehicle includes providing an optical instrument, mounted in the vehicle, the optical instrument providing an image viewable from the vehicle's standard operating position by an operator and the image including a symbolic optical projection. The method further includes providing an azimuth guidance cue in the operation area of the vehicle. The method further includes aligning the symbolic optical projection with the azimuth guidance cue by steering the vehicle.

22 Claims, 24 Drawing Sheets

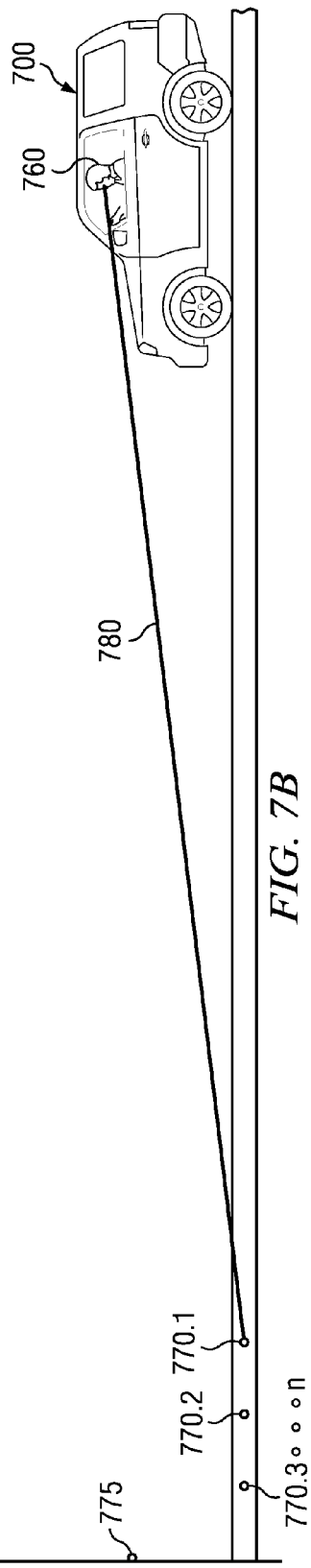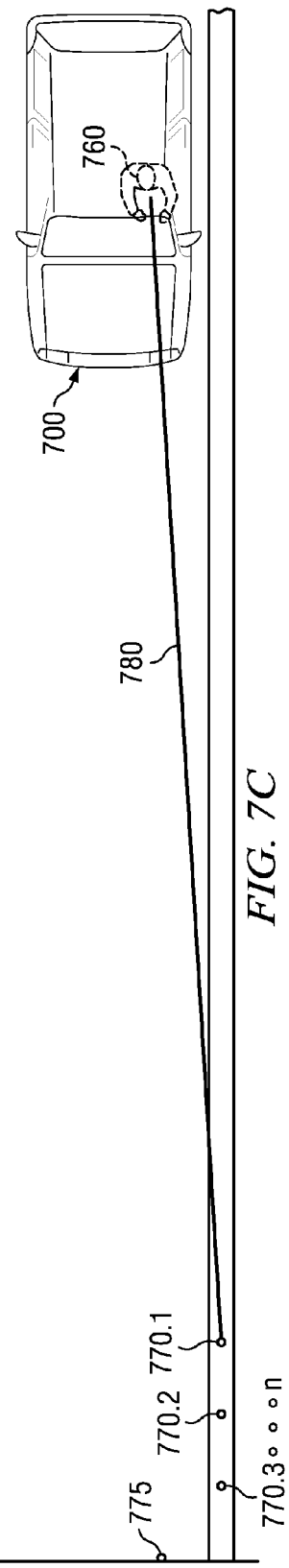

VEHICLE GUIDANCE SYSTEM AND METHOD

CROSS-REFERENCE TO RELATED APPLICATIONS

This application is a national stage application of PCT/US09/64635, filed on Nov. 16, 2009, which claims the benefit of US Provisional Application No. 61/116,184, filed Nov. 19, 2008, both of which are incorporated by reference in their entirety.

BACKGROUND

The precise positioning and guidance of vehicles is important in many venues for many different types of vehicles. The precise positioning of vehicles can enables users to save time and money, consume less fuel, and mitigate impacts on the environment. For instances, in the case of farm equipment, an operator typically must maneuver back and forth across the fields in order to plow, fertilize, and harvest crops. A significant overlap is maintained on each pass (through) (a round) since it may be difficult for a user to properly line up the tractor. In the case of airplanes, when pulling up to a gate, ground crew is needed to properly align the aircraft. In case of inclement weather, such as lightning, ground crew may be unable to work outside and precisely guide the aircraft to the gate. Therefore, gas, time and money are wasted while the airplane waits for the weather to improve.

Specifically, lightning can cause significant delays for airlines. During lightning events at airports, aircraft service personnel must vacate the exposed outdoor area, and proceed to the safety of a building, to prevent injury or death from a lightning strike. The traditional method for parking an aircraft at an aircraft docking area, performed with the assistance of trained ground personnel. Since ground personnel must seek safety during a lightning event, parking of an aircraft is delayed until the threat of lightning ceases. This means that each aircraft, and flight deck crew, must be ready to park between lightning events.

Lightning event delays can last a few minutes or several hours. According to the U.S. Department of Transportation and the FAA Aviation System Performance Metrics Database, the cost of delays for aircraft operations is over $60 per minute. Add to that the cost of a "domino effect" to an airline's schedule such as late passengers, their bags and cargo, connections, reroutes, cancellations, hotels, meals, ground-based employee overtime pay, etc. It becomes possible that each hour spent waiting to park an aircraft at the gate can cost $10,000 or more. The FAA also estimates delays cost passengers and shippers $34.88 per hour on average. Passenger comfort and confidence is eroded, and the result for the airline is lost future revenue.

In respect to agriculture, university studies have shown agricultural equipment operators tend to overlap 5 to 10 percent over the course of an entire day, which could mean up to 4 feet of overlap with a 40-foot implement for each row covered. This costs additional fuel, fertilizer, seed, chemicals, equipment wear and time might cost the average operation.

Other areas also incur additional costs resulting from the imprecise alignment of vehicles, such as cargo loading and vehicle parking.

SUMMARY

The systems and methods described herein assist an operator in achieving precise alignment and guidance of a vehicle.

Since the operator of a vehicle sits a certain position, remote from other positions on a vehicle, his perspective of the location of other points of interest on a vehicle is skewed. One phenomenon that causes a skewed perspective is referred to as parallax. The embodiments described below assist in limiting the effects of parallax on the operation and guidance of a vehicle. Some embodiments provide a view from points of interest. In some alternatives, the view is enhanced in terms of magnification or visual enhancements. In some alternatives, the system provides additional visual or audio indications of alignment. In some alternatives, the system provides automatic vehicle steering.

In one embodiment, a method for aligning a vehicle includes providing an optical instrument, mounted in the vehicle, the optical instrument providing an image viewable from the vehicle's standard operating position by an operator and the image including a symbolic optical projection. The method further includes providing an azimuth guidance cue in the operation area of the vehicle. The method further includes aligning the symbolic optical projection with the azimuth guidance cue by steering the vehicle. In one alternative, the optical instrument is positioned to provide a view from a point of interest. In another alternative, the point of interest is sufficiently distant from the operator such that the operators view in relation to the point of interest creates parallax. In another alternative, the image is a view from a location remote from the vehicle's standard operating position. In yet another alternative, the image reduces parallax between the location and the vehicle's standard operating position. Alternatively, the optical instrument is a camera and associated monitor. In another alternative, the optical instrument is a heads-up display. Optionally, the optical instrument is a gun sight. Optionally, the symbolic optical projection is a retical. In one alternative, the method includes providing an indication to the operator indicating a direction to steer the vehicle in order to align the symbolic optical projection with the azimuth guidance cue. In another alternative, the indication is provided by a computing system receiving the image from the optical device. In one alternative, the method includes adjusting the direction of the vehicle using a computing device based on the image, wherein the image is provided to the computing device, and the direction is adjusted to follow the azimuth guidance cue.

In one embodiment of a system for aligning a vehicle, the system includes an optical instrument, mounted on the vehicle, the optical instrument providing an image viewable from the vehicle's standard operating position by an operator and the image including a symbolic optical projection and an azimuth guidance cue, having a path, in the operation area of the vehicle; wherein when the symbolic optical projection is aligned with the azimuth guidance cue the vehicle follows the path of the azimuth guidance cue. Optionally, the system includes a processor that receives signals from the optical instrument. Optionally, the processor enhances the image by highlighting the azimuth guidance cue. Optionally, the processor determines whether the symbolic optical projection is aligned with the azimuth guidance cue and provides an indication of alignment to the operator. Optionally, the indication of alignment further includes an indication of what direction to steer the vehicle in order to achieve alignment. In one alternative, the optical instrument includes a camera and a monitor that communicates with the camera. In another alternative, the processor enhances the image by identifying a contrast line between a first and second area, the first and second area having different visual characteristics, the processor further enhancing the image by highlighting the identified contrast line.

One embodiment of a method for aligning a vehicle includes providing a first and second optical instrument, mounted in the vehicle, the first and second optical instrument providing a first and second image viewable from the vehicle's standard operating position by an operator and the image including a first and second symbolic optical projection. The method further includes, providing a first and second azimuth guidance cue in the operation area of the vehicle. The method further includes aligning the first and second symbolic optical projection with the first and second azimuth guidance cue by steering the vehicle.

BRIEF DESCRIPTION OF THE DRAWINGS

FIGS. 7a-7c show another embodiment of a vehicle guidance system and method;

FIGS. 8a-8c show another view of the vehicle guidance system and method of FIG. 7a;

DETAILED DESCRIPTION

Figure 1:
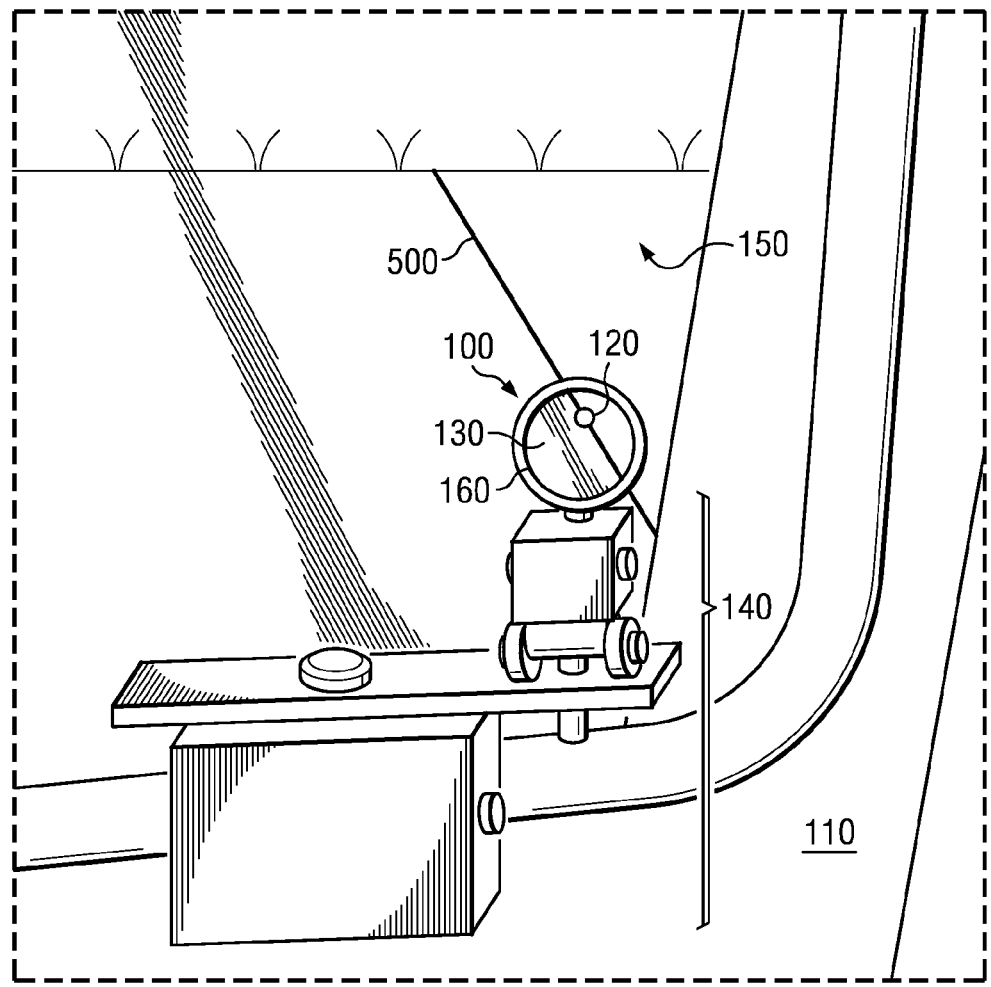
FIG. 1 shows one embodiment of a vehicle guidance system and method.

Parallax is an apparent displacement or difference of orientation of an object viewed along two different lines of sight, and is measured by the angle or semi-angle of inclination between those two lines. As the eyes of humans and other animals are oriented in different positions on the head, parallax is caused by different views that are simultaneously presented. The brain typically accounts for parallax and gains visual perception by using stereopsis, which is the visual convergence of images in the centers of the eyes' retina, thus according the brain distance and depth perception to an object. In optical instruments such as gun sights or heads-up displays, precise focus helps to reduce parallax and provide for accurate perception.

1. System and Method for Reducing Parallax

Described herein are multiple embodiments and alternatives for systems and methods for reducing parallax in a vehicle guidance system. Parallax is an apparent displacement or difference of orientation of an object viewed along two different lines of sight, and is measured by the angle or semi-angle of inclination between those two lines. An operator of a vehicle may be unable to interpret visual cues properly in relation to all portions of a vehicle due to parallax. Due to parallax, operators of various vehicles may misalign the vehicle in relation to various guides or alternatively compensate for parallax by leaving a larger margin for error than necessary. In many cases, as explained below, leaving a larger margin for error results in reduced efficiency, ultimately costing time and money.

In order to reduce the effects of parallax on a user's ability to align a vehicle or a point on a vehicle a reduced parallax view is provided. Many drivers instinctively lean or move their body within the vehicle to attempt to reduce parallax, however, in many circumstances; this is not feasible or safe. Therefore, by providing the user a system that reduces the effects of parallax, a vehicle may be aligned without the user or a second party viewing guides from the point of interest.

In one embodiment an optical device provides a parallax reduced view of a guide to a user. In providing the parallax reduced view the user is enabled to line up the vehicle with the guide without the effect of parallax biasing the alignment of the vehicle. In this case the indication is the appearance of the guide being dead center in the parallax reduced view. Alternatively, another alignment other than dead center in the parallax reduced view may be desired.

2. Optical Systems

Various optical systems may be used to provide a parallax reduced view. One example of an optical system is an optical sight such as a gun sight. A view through the gun sight is provided to the user, so that the user can look through the gun sight from a convenient position for vehicle operation. Another optical system is a camera positioned at the point of interest and a screen for receiving signals from the camera. The screen is positioned so that the user can view the screen from a convenient position for vehicle operation. In one alternative, the camera is a camera that can communicate with a cellphone/smart phone or aftermarket GPS device. Examples of communication protocol include Bluetooth communications protocol; however, any wired or wireless communication protocol may be used. Bluetooth technology is a popular technology for short range communications between portable devices and various other systems. Another optical system is a camera positioned at the point of interest and a heads-up display for receiving signals from the camera. The heads-up display is projected so that the user can view the heads-up display from a convenient position for vehicle operation, for instance on or directly in front of a windshield.

Another optical system is a non-imaging sensor positioned at the point of interest and a heads-up display for receiving signals from the non-imaging sensor. The heads-up display is projected so that the user can view the heads-up display from a convenient position for vehicle operation, for instance on or directly in front of a windshield. Another optical system is a non-imaging sensor positioned at the point of interest and a screen for receiving signals from the non-imaging sensor. The screen is positioned so that the user can view the screen from a convenient position for vehicle operation, for instance on or directly in front of a windshield.

In optical systems involving additional features beyond simply rely of an image, typically a specially adapted processor or computer system is included for adapting and modifying the image provided to the user, as well as providing indications and controlling the vehicle as needed.

3. Methods of Usage 3.1. Indications to the User

In various embodiments, the user is alerted of the alignment according to the parallax reduced view by various indications. One example is a visual indication. In this methodology, the user is presented with an image (actual or virtual) representative of the alignment of the vehicle according to the parallax reduced vantage point. Alternatively, the image may additionally have a retical, or various demarcation points indicative of the alignment of the vehicle. The image may be an actual image or a computer generated image representative of the actual image. In another embodiment, a symbolic indication may be provided to the user, such as arrows indicating which direction to maneuver the vehicle in order to align it. Alternatively, audio indications may be provided, including but not limited to verbal commands such as "left" and "right." Alternatively, the user may be provided with kinetic indications through the steering device, such as vibrations or pull in various control elements. In an alternative embodiment, the user activate an automatic adjustment system, whereby, once the vehicle is lined up on a guide, the automatic adjustment system steers the vehicle in order to maintain alignment according to the parallax reduced view. Accordingly, combinations of the above described indications may be employed.

3.2. Enhancements to Imaging

In the various embodiments described above, enhancements to the images provided to the user are optionally provided. The camera image is enhanced in order to more clearly provide to the user a guide. In one embodiment, enhancement is provided along image contrast lines. The enhancement includes superimposing a computer generated line on the image based on the identification of a contrast line between two areas.

Alternatively, guides on surfaces such as runways, roads, etc., are painted a certain color, with a certain reflectivity, or other special property and the cameras or sensors are configured to detect that color or special property. For instance in one embodiment, guides have infrared reflectivity or emission and the camera used to reduce parallax is configured to detect infrared. This technique is useful to apply in situations where surfaces are obscured by snow, ice, or debris. Alternatively, the guide may be a certain color. Instead or configuring the camera to detect this color, a processor in communication with the camera parses a detected image to identify the color. After detection the guide image is enhanced or locked on to by the system.

Further enhancements to imaging may include magnification of the image or alternation of the perspective of the image.

4. Examples of Applicability to Various Systems 4.1. Land Vehicles 4.1.1. Tractors/Farm Equipment As shown in FIG. 1, in one embodiment of the present vehicle guidance system and method, the system includes an optical instrument such as a gun sight 100 mounted in a tractor 110 that utilizes reflective or refractive optical collimators to generate a collimated image of a luminous or reflective retical 120. This collimated image is reflected off a dichroic mirror or beam splitter to allow an operator to see a field of view 130 and a reflection of the retical 120 simultaneously. This provides the operator with an image of the retical superimposed over the field of view 130 at infinity with generally reduced parallax or without parallax. In this embodiment, a gun sight mount 140 supporting the gun sight 100 is positioned within the cab of the tractor 110 to allow viewing through the gun sight 100 outside a window 150 of the tractor 110 and the gun sight 100 is oriented at a predetermined position wherein the retical 120 is superimposed over a visual cue 400 (shown in FIG. 4) in the field of view 130. In FIG. 1, the retical 120 is seen from the operator's point of view through a lens 160 of the gun sight 100. In operation, the retical may appear in a color, such as red. An azimuth guidance track 500 is also shown in FIGS. 1-5 and described in further detail below.

Figure 2:
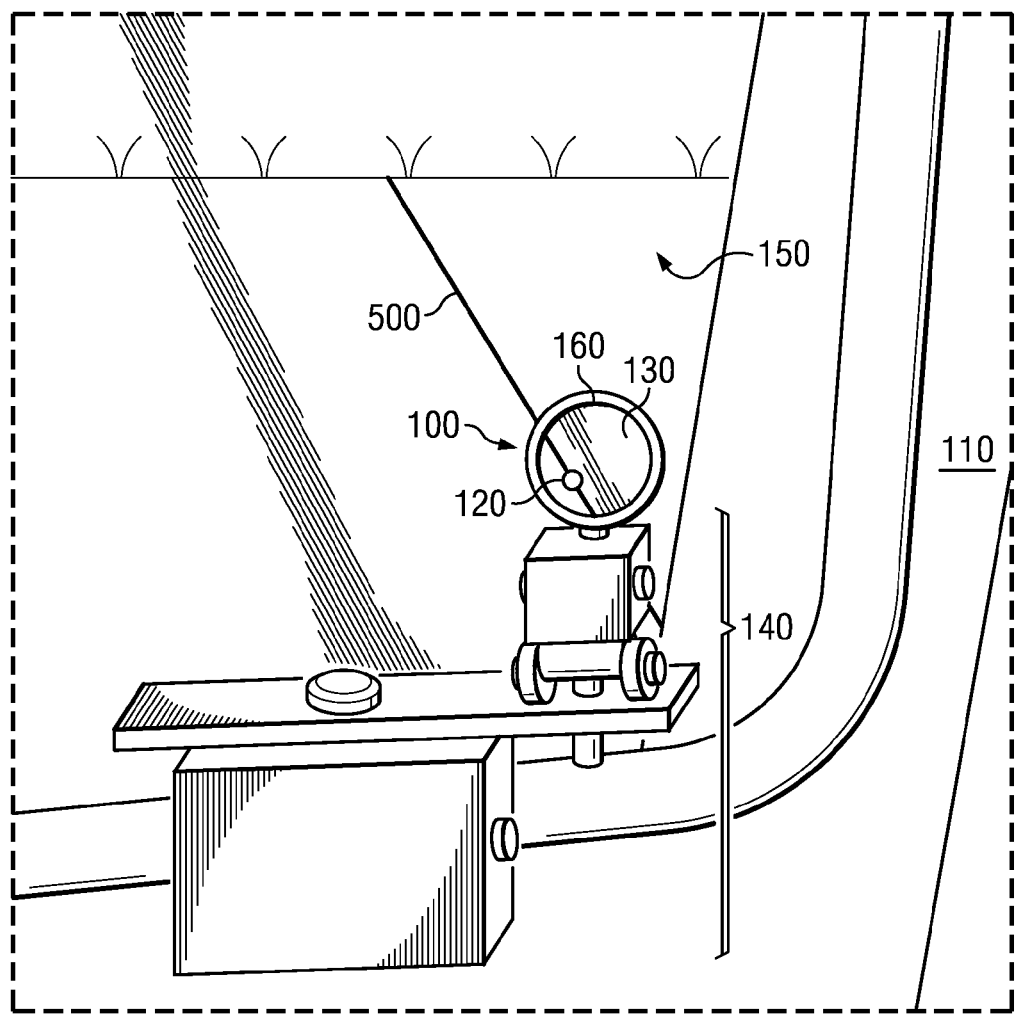
FIG. 2 shows another view of the vehicle guidance system and method of FIG. 1.

FIG. 2 shows another embodiment similar to the embodiment in FIG. 1, wherein the only differing factor is that the operator's position within the tractor 110 has changed slightly. In this embodiment, the retical 120, the tractor 110 and the visual cue 400 (shown in FIG. 4) in the field of view 130 have remained in exactly the same relative positions and orientations as shown in FIG. 1. The retical 120 appears in a different position within the gun sight 100 in FIG. 2 due to the operator changing position generally vertically upward and horizontally to the right. As long as the operator maintains visual contact with the retical 120 within the field of view 130 of the gun sight 100, parallax does not affect the visual accuracy of the superimposition of the retical 120 over the visual cue 400 in the field of view 130.

Figure 3:
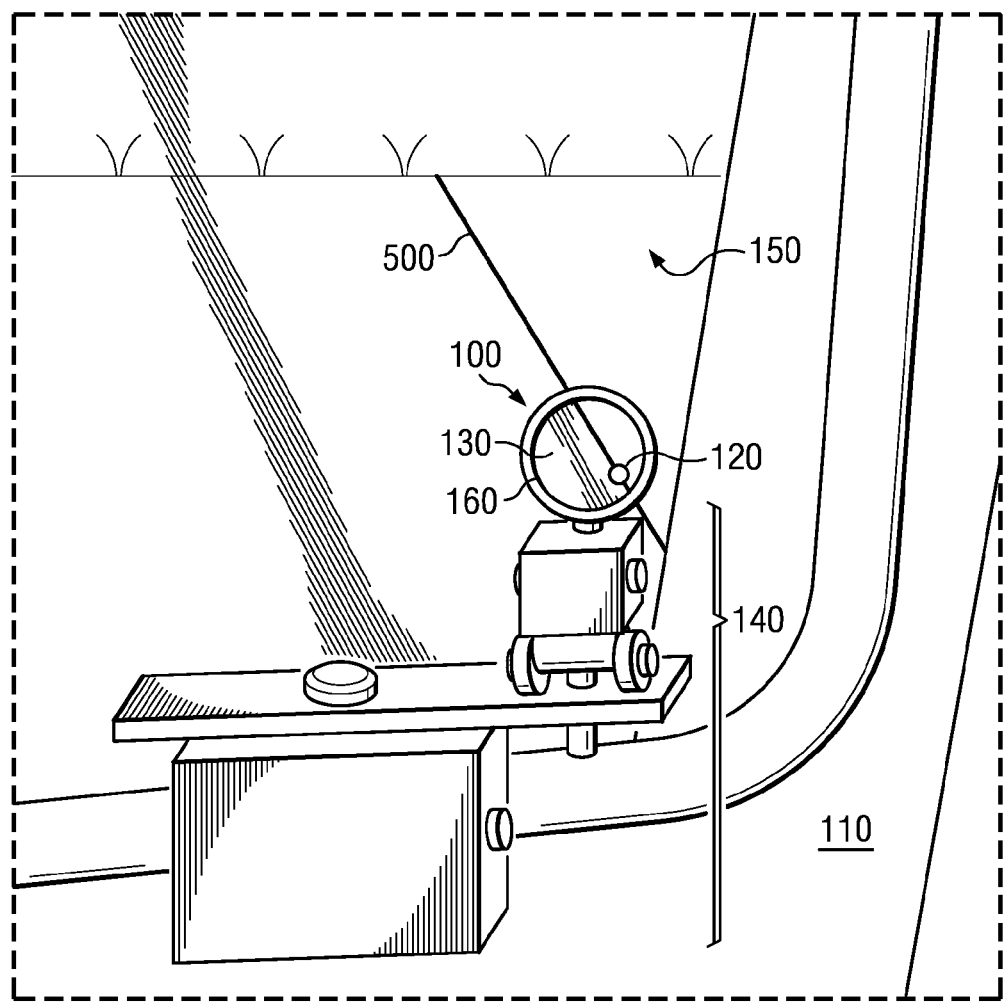
FIG. 3 shows another view of the vehicle guidance system and method of FIG. 1.

Similarly, FIG. 3 shows yet another embodiment of FIG. 1 where the operator has repositioned within the tractor 110 to maintain visual contact with the retical 120 in the field of view 130 but because of the operator's repositioning, the retical 120 appears in a different orientation in the field of view 130 of the gun sight 100. As with FIG. 2, the retical 120 continues to superimpose over the visual cue 400 in the field of view 130.

Figure 4:
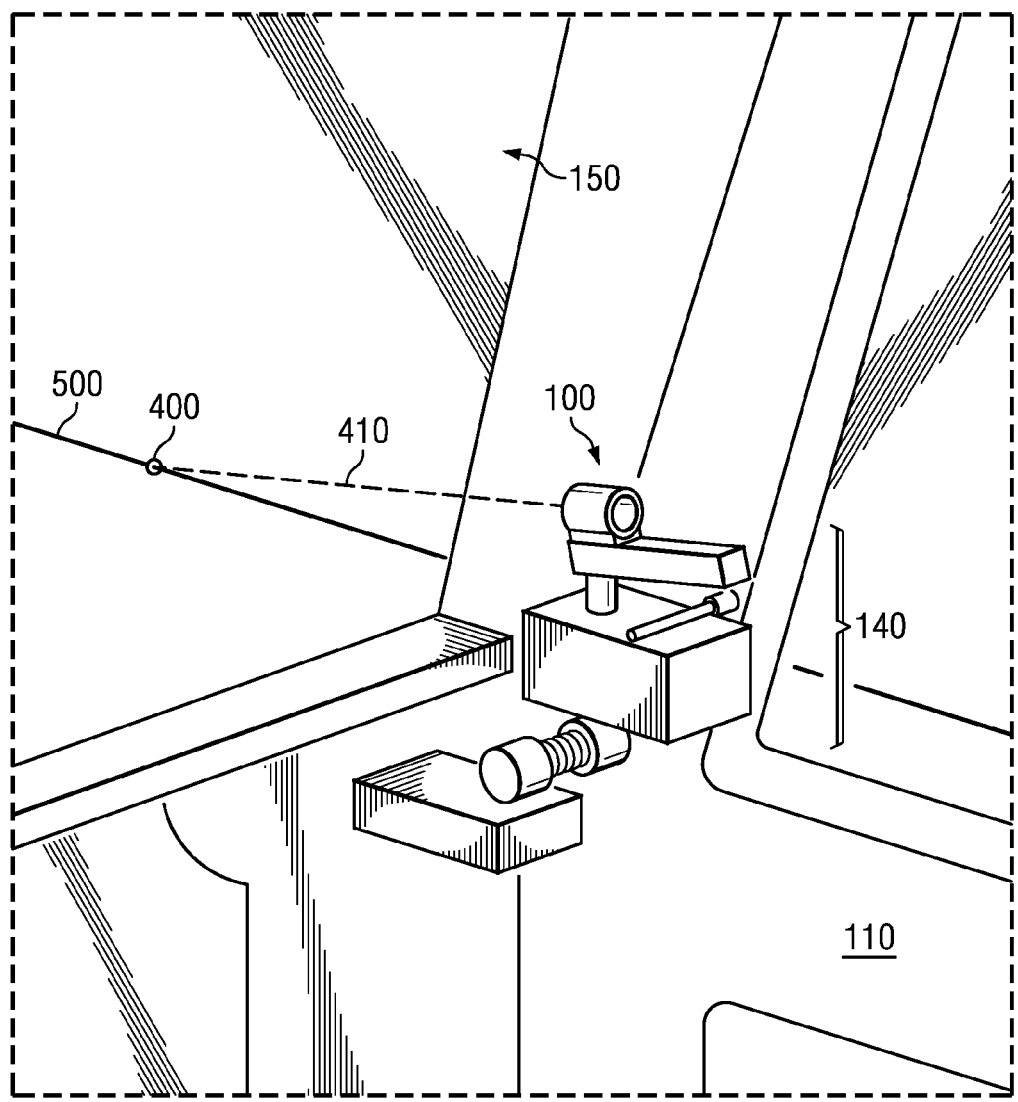
FIG. 4 shows another view of the vehicle guidance system and method of FIG. 1.

The embodiment of the present invention shown in FIG. 1 is further shown in FIG. 4. In FIG. 4, the gun sight 100 is mounted upon the gun sight mount 140 inside the cab of the tractor 110, as described for FIG. 1. In FIG. 4, a predetermined visual cue 400 is aligned with the retical (described above) inside the gun sight 100. A dashed line of superimposition 410 denotes the planar alignment of the visual cue 400 and the retical 120 (not shown on FIG. 4) within the gun sight 100. Visual cue 400 may exhibit varying visual properties and may be reflecting, illuminating, projecting or contrasting. Reflecting visual cues may include parabolic-shaped light reflectors, prism reflectors, mirrors or other objects exhibiting the characteristic of reflecting light. Illuminating visual cues include objects such as lamps that generate, supply or emit light. Projecting visual cues are light patterns emitted from a projection device such as a projector or laser, projecting onto a surface within the operator's field of view. Contrasting visual cues are differences in visual properties that make an object distinguishable from other objects and the background. Contrasting visual cues are typically determined by the difference in the color and brightness of the object and other objects within the same field of view.

Figure 5:
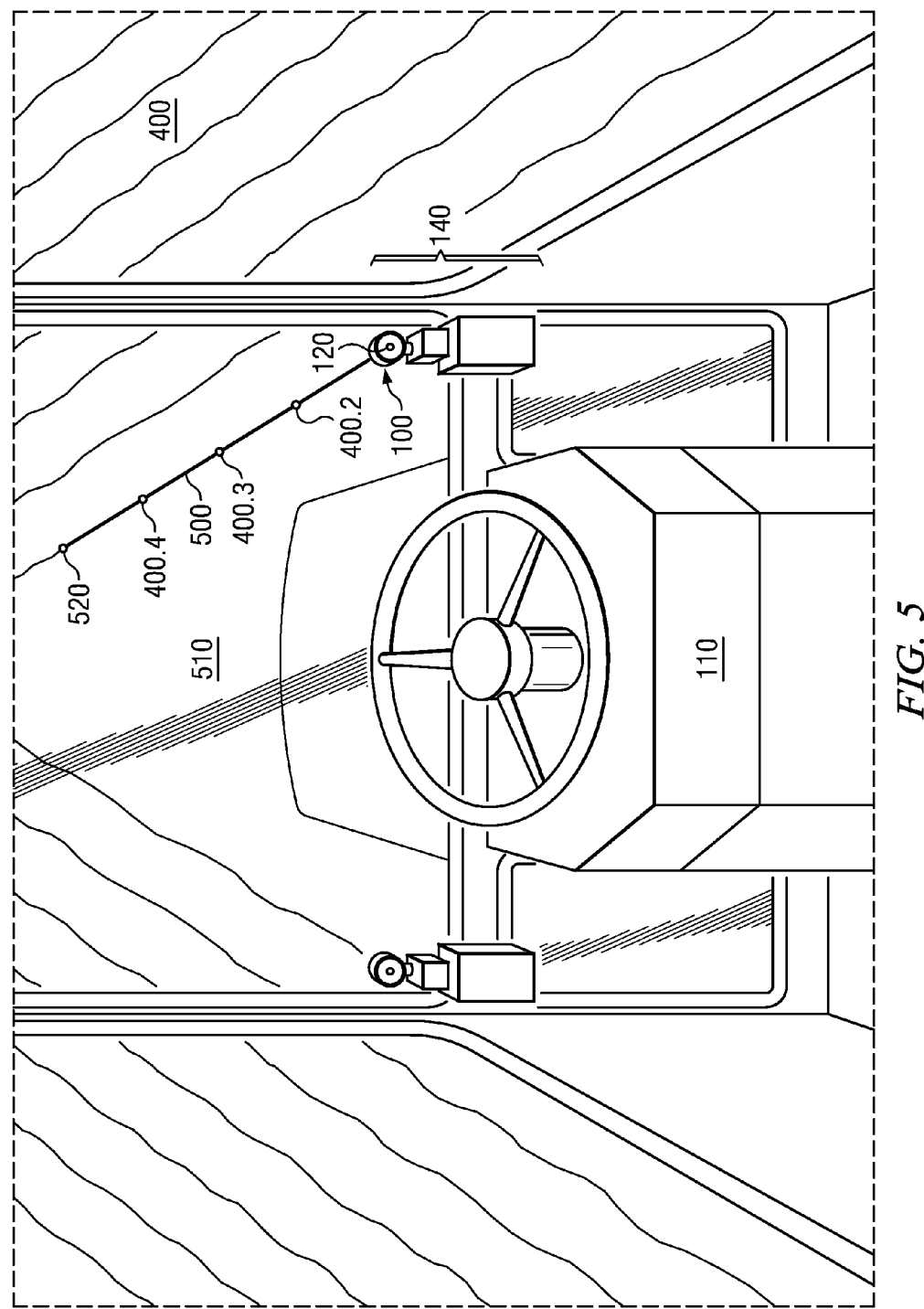
FIG. 5 shows another view of the vehicle guidance system and method of FIG. 1.

FIG. 5 shows a contrasting visual cue 400 as viewed from the operator's location in the tractor 110. In this embodiment, the contrasting visual cue 400 is shown as a darkened plowed portion of a field and is separated and distinguished from an unplowed portion of the field 510 by the azimuth guidance track 500. The azimuth guidance track 500 defines a clear demarcation between the contrasting visual cue 400 and the unplowed portion of the field 510. With a contrasting visual cue such as the contrasting visual cue 400 shown in FIG. 5, the azimuth guidance track 500 provides a visual geometrically linear outer boundary of the contrasting visual cue 400. The azimuth guidance track 500 can be an infinitely long, straight curve that contains an infinite number of points, but in practice will end at a termination point 520. For purposes of illustration, FIG. 5 also shows visual contrast cues 400.2, 400.3, 400.4 that appear along and are connected by azimuth guidance track 500. Visual contrast cue 400.1, which exists in FIG. 5, does not appear in FIG. 5 because it is perfectly aligned with and superimposed underneath retical 120. Visual contrast cues 400.1, 400.2, 400.3 and 400.4 . . . n do not physically exist in operation, but are shown herein to illustrate operation of the vehicle guidance system and method. It is contemplated that an infinite number of visual contrast cues 400.1 . . . n exist along azimuth guidance track 500.

During initial setup, the operator aligns the gun sight 100 with the visual contrast cue 400.1 (not shown) and confirms that the retical 120 directly superimposes over visual contrast cue 400.1, which is located on the azimuth guidance track 500. After proper alignment, the operator may begin operation of the tractor 110, which for purposes of this embodiment, is to tow a plow to cultivate soil in the field. Other embodiments of the present invention contemplate use on any farm machinery or other motorized vehicles including, but not limited to, combines, tractors, trucks, lawn tractors, lawn mowers, and any other motorized vehicle. During operation, the operator directs the tractor 110 to advance forward in the field from the view as shown in FIG. 5. As the operator advances the tractor 110 forward, the operator confirms that retical 120 maintains continual superimposition upon azimuth guidance track 500. In the embodiment shown in FIG. 5, as the tractor 110 proceeds forward, the retical 120 follows a substantially identical parallel plane to the plane containing azimuth guidance track 500. After the tractor 110 travels a sufficient distance, retical 120 should directly superimpose upon visual contrast cue 400.2. If retical 120 does not directly superimpose upon visual contrast cue 400.2, this will indicate to the operator that the tractor 110 is not properly aligned in the field and that an adjustment to the direction of travel of the tractor 110 or an adjustment to the alignment of the gun sight 100 should occur. To ensure proper alignment of the tractor 110, the operator should seek to continually align and superimpose retical 120 upon and along azimuth guidance track 500.

It is contemplated that in FIG. 5, as the tractor 110 continues to proceed forward in the field past visual contrast cue 400.2, retical 120 proceeds along the azimuth guidance track 500 towards visual contrast cue 400.3. As above, after the tractor 110 travels a sufficient distance, retical 120 should directly superimpose upon visual contrast cue 400.3. If retical 120 does not directly superimpose upon visual contrast cue 400.3, this will serve to indicate to the operator that the tractor 110 is not properly aligned in the field and that an adjustment to the direction of travel of the tractor 110 or an adjustment to the alignment of the gun sight 100 should occur. Again, to ensure proper alignment of the tractor 110, the operator should seek to continually align and superimpose retical 120 upon and along azimuth guidance track 500.

Similarly, in FIG. 5, as the tractor 110 continues to proceed forward in the field past visual contrast cue 400.3, retical 120 proceeds along the azimuth guidance track 500 towards visual contrast cue 400.4. As above, after the tractor travels a sufficient distance, retical 120 should directly superimpose upon visual contrast cue 400.4. If retical 120 does not directly superimpose upon visual contract cue 400.4, this will again serve to indicate to the operator that the tractor 110 is not properly aligned in the field and that an adjustment to the direction of travel of the tractor 110 or an adjustment to the alignment of the gun sight 100 should occur. Again, to ensure proper alignment of the tractor 110, the operator should continue to seek to continually align and superimpose retical 120 upon and along azimuth guidance track 500.

Also shown in FIG. 5 is the termination point 520 of azimuth guidance track 500. The termination point 520 may be indicated by any predetermined visual cue, which may be reflecting, illuminating, projecting, or contrasting as outlined above. After the tractor proceeds past visual contrast cue 400.4, the retical 120 proceeds along the azimuth guidance track 500 towards termination point 520. When the tractor 110 travels a sufficient distance, prior to retical 120 reaching termination point 520, the operator prepares to take the necessary steps to stop forward movement of the tractor 110, including preparing to disengage any of the operational mechanisms. When retical 120 reaches and aligns with termination point 520 of azimuth guidance track 500, the operator stops forward movement of the tractor 110 and vehicle guidance pursuant to this embodiment is complete.

Figure 6:
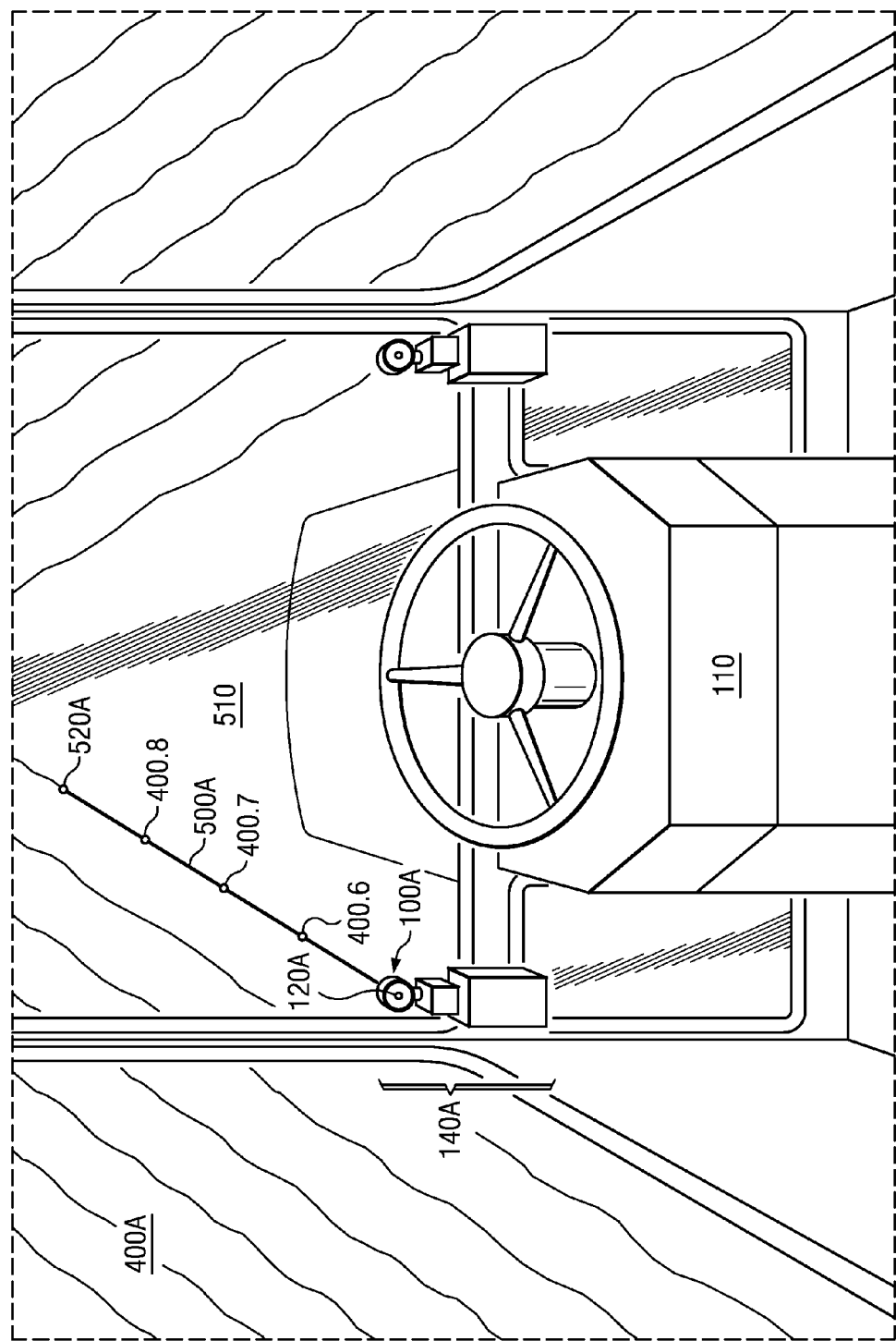
FIG. 6 shows another view of the vehicle guidance system and method of FIG. 1.

FIG. 6 shows an additional embodiment of the present invention wherein the system of the present invention can also be positioned in a plurality of locations in the tractor 110. In this specific embodiment, the contrasting visual cue 400A (not shown) is located visually to the left of the tractor. Similar to above, during initial setup, the operator aligns the gun sight 100A with the visual contrast cue 400.5 (not shown) and confirms that the retical 120A directly superimposes over visual contrast cue 400.5, which is located on the azimuth guidance track 500A. After proper alignment, the operator may begin operation of the tractor 110, which for purposes of this embodiment, is to tow a plow to cultivate soil in the field. Other embodiments of the present invention contemplate use on any farm machinery or other motorized vehicles including, but not limited to, combines, tractors, truck, lawn tractors, lawn mowers, and any other motorized vehicle. During operation, the operator directs the tractor 110 to advance forward in the field from the view as shown in FIG. 6. As the operator advances the tractor 110 forward, the operator confirms that retical 120A maintains continual superimposition upon azimuth guidance track 500A. In the embodiment shown in FIG. 6, as the tractor 110 proceeds forward, the retical 120A follows a substantially identical parallel plane to the plane containing azimuth guidance track 500A. After the tractor 110 travels a sufficient distance, retical 120A should directly superimpose upon visual contrast cue 400.6. If retical 120A does not directly superimpose upon visual contrast cue 400.6, this will indicate to the operator that the tractor 110 is not properly aligned in the field and that an adjustment to the direction of travel of the tractor 110 or an adjustment to the alignment of the gun sight 100A should occur. To ensure proper alignment of the tractor 110, the operator should seek to continually align and superimpose retical 120A upon and along azimuth guidance track 500A.

As in FIG. 5, visual contrast cues 400.5, 400.6, 400.7 and 400.8 . . . n shown in FIG. 6 do not physically exist in operation, but are shown herein to illustrate operation of the vehicle guidance system and method. It is contemplated that an infinite number of visual contrast cues 400.5 . . . n exist along azimuth guidance track 500A.

It is additionally contemplated that in FIG. 6, as the tractor 110 continues to proceed forward in the field past visual contrast cue 400.6, retical 120A proceeds along the azimuth guidance track 500A towards visual contrast cue 400.7. As above, after the tractor 110 travels a sufficient distance, retical 120A should directly superimpose upon visual contrast cue 400.7. If retical 120A does not directly superimpose upon visual contrast cue 400.7, this will serve to indicate to the operator that the tractor 110 is not properly aligned in the field and that an adjustment to the direction of travel of the tractor 110 or an adjustment to the alignment of the gun sight 100A should occur. Again, to ensure proper alignment of the tractor 110, the operator should continue to seek to continually align and superimpose retical 120A upon and along azimuth guidance track 500A.

Similarly, in FIG. 6, as the tractor 110 continues to proceed forward in the field past visual contrast cue 400.7, retical 120A proceeds along the azimuth guidance track 500A towards visual contrast cue 400.8. As above, after the tractor travels a sufficient distance, retical 120A should directly superimpose upon visual contrast cue 400.8. If retical 120A does not directly superimpose upon visual contract cue 400.8, this will again serve to indicate to the operator that the tractor 110 is not properly aligned in the field and that an adjustment to the direction of travel of the tractor 110 or an adjustment to the alignment of the gun sight 100A should occur. Again, to ensure proper alignment of the tractor 110, the operator should continue to seek to continually align and superimpose retical 120A upon and along azimuth guidance track 500A.

Also shown in FIG. 6 is the termination point 520A of azimuth guidance track 500A. The termination point 520A may be indicated by any predetermined visual cue, which may be reflecting, illuminating, projecting, or contrasting as outlined above. After the tractor proceeds past visual contrast cue 400.8, the retical 120A proceeds along the azimuth guidance track 500A towards termination point 520A. When the tractor 110 travels a sufficient distance, prior to retical 120A reaching termination point 520A, the operator prepares to take the necessary steps to stop forward movement of the tractor 110, including preparing to disengage any of the operational mechanisms. When retical 120A reaches and aligns with termination point 520A of azimuth guidance track 500A, the operator stops forward movement of the tractor 110 and vehicle guidance pursuant to this embodiment is complete.

4.1.2. Cars/Trucks

A vehicle guidance system implemented in a car or truck may be implemented for a number of functions. These functions include parking, cruise control enhancement, tired driver warnings, and erratic driving warnings. Since most roadways already include identifiable guidance cues in the form of the painted road, lane, and parking space lines that denote various areas of roads and parking lots, a guidance system may be adapted to utilize these cues. In relation to the above described embodiments for a tractor, the painted lines may function as azimuth guidance cues.

In terms of parking, the azimuth guidance cues in the form of parking spaces can clearly be aligned according to the above described gun sight and retical system or optic symbology alignment facilitators. Furthermore, a camera and monitor system can be used with optic symbology alignment facilitators indicated on the display of the monitor. As suggested above, in one embodiment the monitor may be a smart phone/cell phone, an aftermarket GPS guidance device, or a built in GPS guidance system monitor. In the case of cruise control operation on the highway, the lane lines serve as azimuth guidance cues. In addition to allowing the driver to line up the vehicle according to retical optical symbology alignment facilitators, or display generated optical symbology alignment facilitators, the system itself may have warning indicators when the alignment of the vehicle in relation to azimuth guidance cues departs from a preset difference from perfect alignment. These indicators may be flashing lights, arrows, or audio cues, indicating that the driver should align the vehicle in the indicated direction. In one alternative, partial control of the steering mechanism of the vehicle is surrendered to a cruise control system integrated with the vehicle guidance system. In this alternative, a processing unit steers the vehicle to maintain alignment with the azimuth guidance cues.

Optionally, multiple cameras used to anticipate changes in the direction of the azimuth guidance cues. Optionally, multiple optical symbology alignment facilitators are used by the processing program to maintain alignment. These multiple optical symbology alignment facilitators focus on alignment at varying distances, so that the system anticipates steering needs based on the speed of the vehicle and distance of the observation associated with the multiple optical symbology alignment facilitators. In one alternative, a proximity sensor is also incorporated in the guidance system in order to measure the proximity between the user's vehicle and other vehicles in front of the user's vehicle. When the proximity of a vehicle in front of a user's vehicle is contact, the guidance system maintains the present speed of the cruise control. When the proximity is slowly getting closer, the guidance system slowly decelerates the user's vehicle. When the proximity is rapidly getting closer, cruise control is shut off and an alert is sounded in the user's vehicle. In one alternative, the vehicle guidance system detects when a vehicle strays from azimuth guidance cues and notifies the user that he or she is likely driving erratically or falling asleep.

Figure 14:
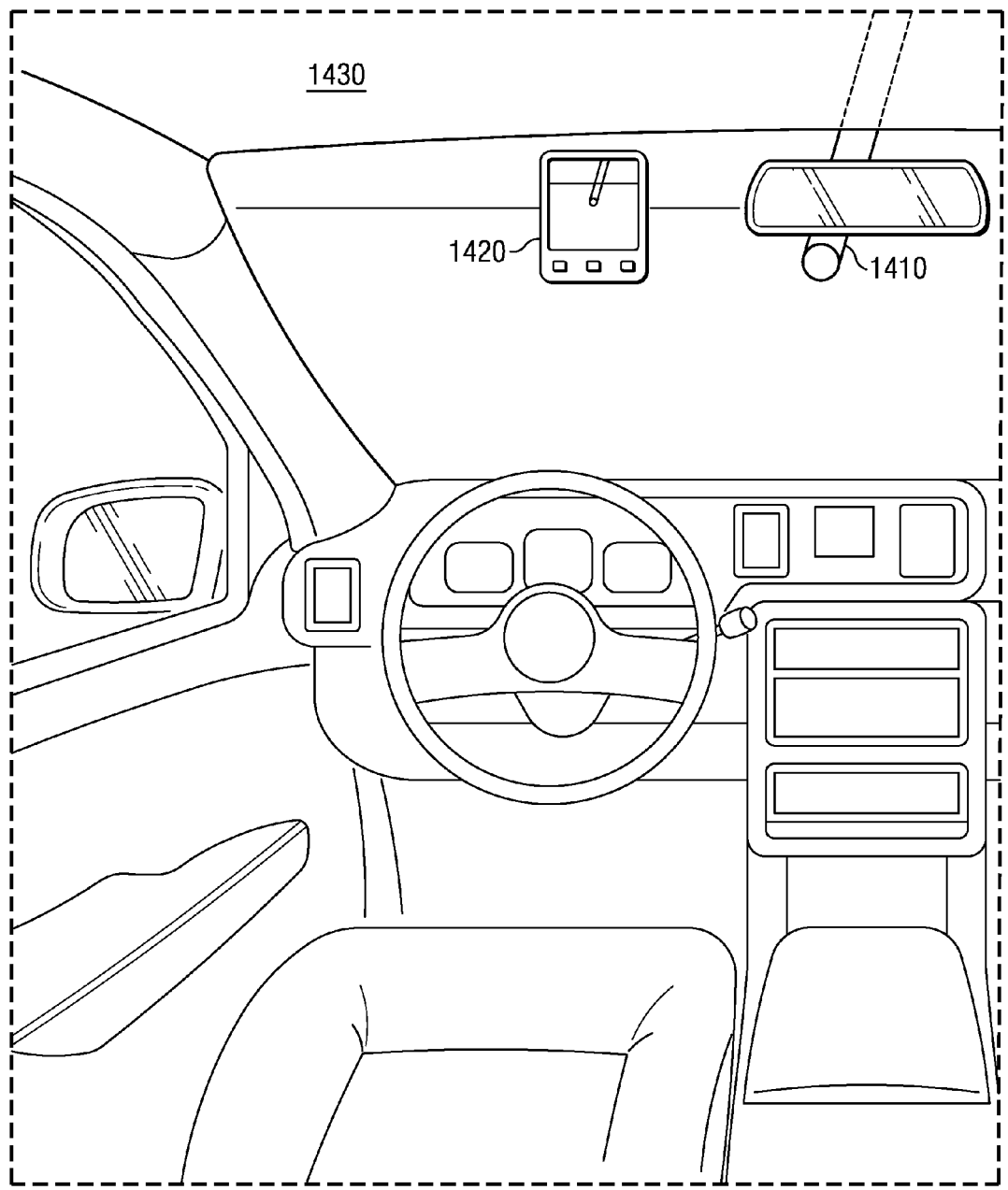
Figure 15:
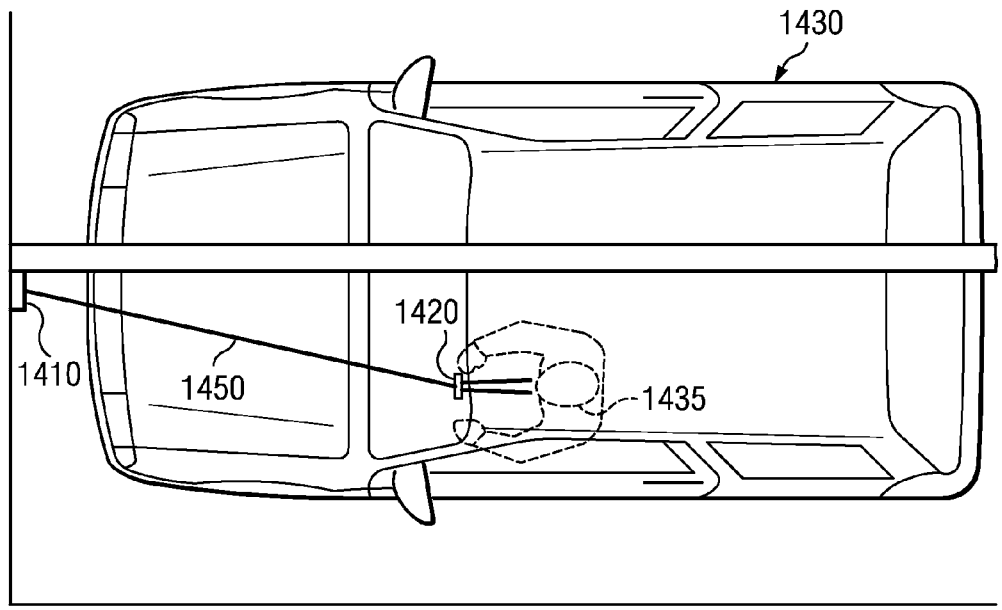
Figure 16:
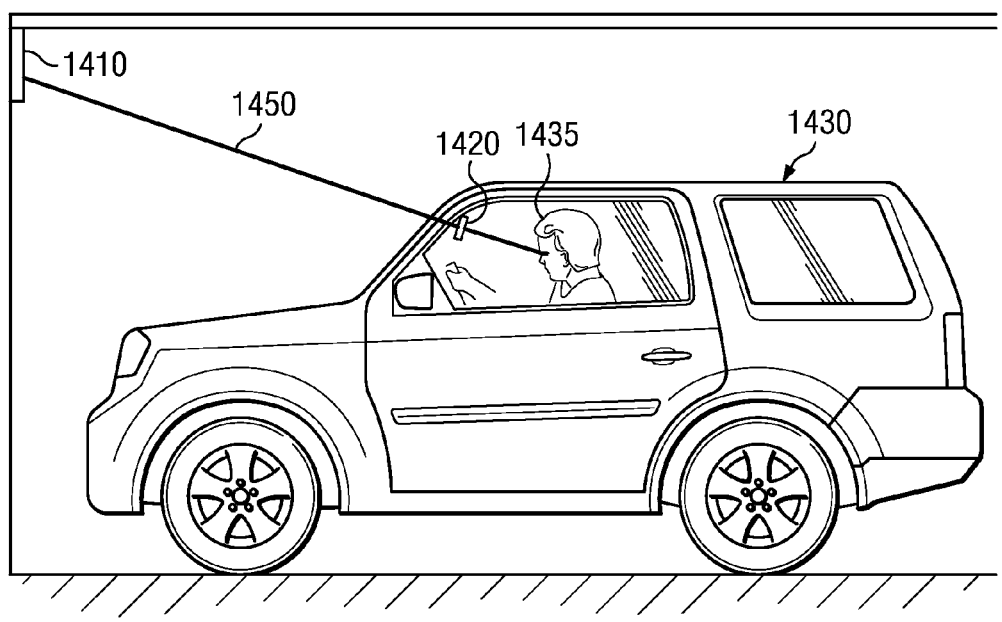

FIG. 14 shows one embodiment of a vehicle guidance system implemented in a car or truck. This embodiment is used for parking a vehicle in a garage or other parking structure. In a parking structure, the vehicle guidance cue 1410 is located on the ceiling. Alternatively, the guidance cue may be located on the floor or walls of the parking structure. In this embodiment the system is designed so that the vehicle is oriented on the centerline of the guidance cue. Alternatively, a wheel or side of the vehicle may be centered on the guidance cue 1410. A camera positioned at the point that is desired to be lined up with the guidance cue captures an image and feeds it to monitor 1420. Monitor 1420 displays an image of the guidance cue and a retical, bull's-eye, or other alignment indicator. The operator 1440 lines up the retical or other alignment indicator viewed on the monitor 1420 with the guidance cue 1410 by steering vehicle 1430. As described above, monitor 1420 may be a variety of devices, such as a smart phone, a GPS device, etc. FIG. 15 shows an overhead view of vehicle 1430 and guidance cue 1410. The position of operator 1440 is shown in relation to the guidance cue 1410 as well as operator 1440 actual line of sight 1450. As is clear in FIG. 16, guidance cue 1410 may wrap on walls, floors, ceilings, or other irregular surfaces without disrupting the function of the guidance system.

Figure 17:
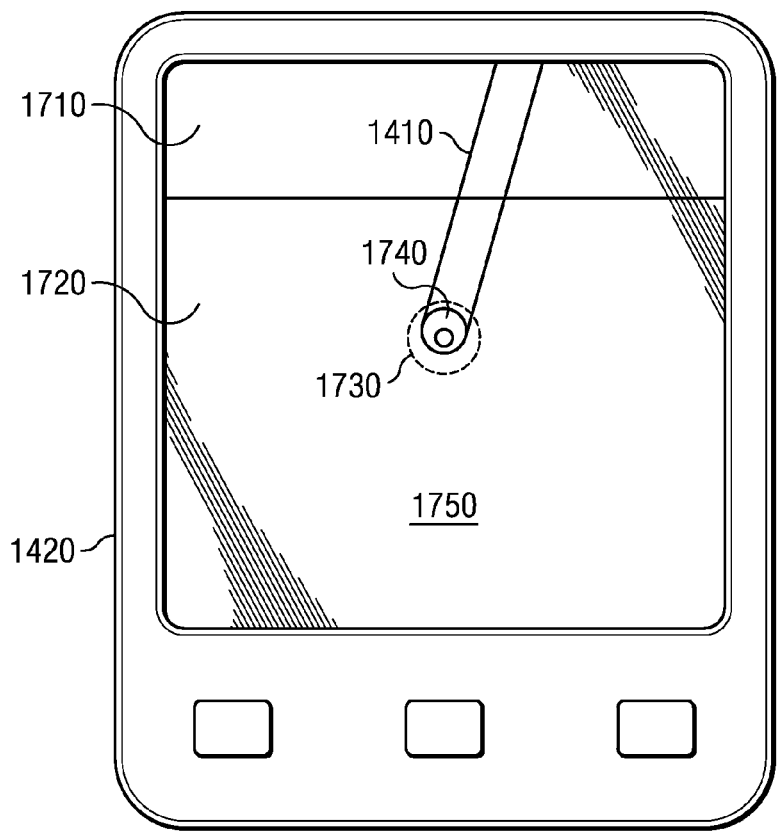
FIGS. 14-17 show different views of another embodiment of a vehicle guidance system and method.

FIG. 17 shows a more detailed view of monitor 1420. Monitor 1420 shows guidance cue 1410 as it passes from ceiling 1710 to wall 1720. The operator lines up retical 1730 with guidance cue 1410. Further, guidance cue 1410 includes stop cue 1740. Monitor 1420 provides a view 1750 from the camera positioned at the point of interest. In one alternative, when the retical reaches the stop cue 1740 the monitor indicates this occurrence using a visual or audio indicator.

Figure 29:
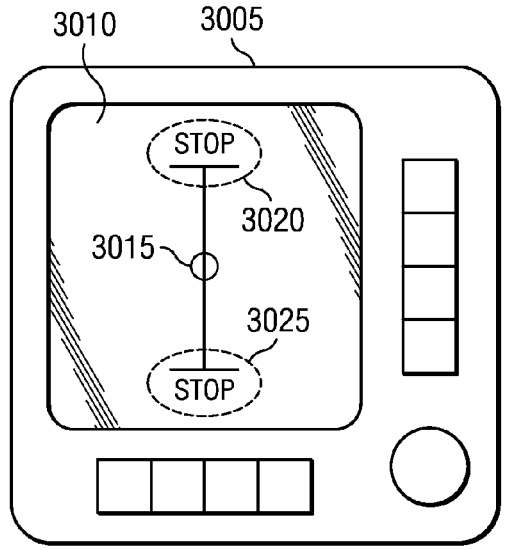
FIG. 29 shows an embodiment of a parallax limited symbology viewing device.

FIG. 29 shows an embodiment of a parallax limited symbology viewing device 3005, for use with a motorized vehicle such as a car. Screen 3010 depicts vehicle reference line 3015 and top and bottom stop reference lines 3020, 3025. These lines are projected on to the image captured by the camera that feeds the parallax limited symbology viewing device 3005.

Figure 30:
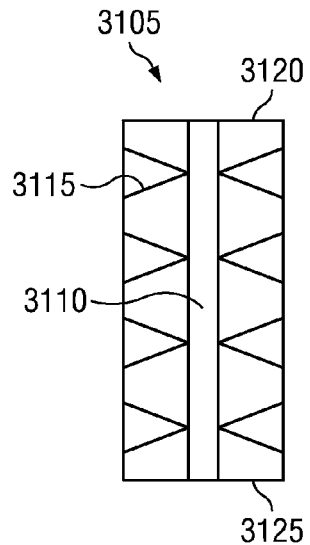
FIG. 30 shows an embodiment of a parking guidance cue providing azimuth guidance.

FIG. 30 shows an embodiment of a parking guidance cue 3105 providing azimuth guidance. Line 3110 is the lead-in line-up cue and is depicted in green typically. The steer left and steer right cues 3115, 3120 include red with yellow chevrons that are oriented to point in the direction that the driver needs to steer in order to align the vehicle. The top and bottom edges of the parking guidance cue 3105 are stop cue 3125.

Figure 31:
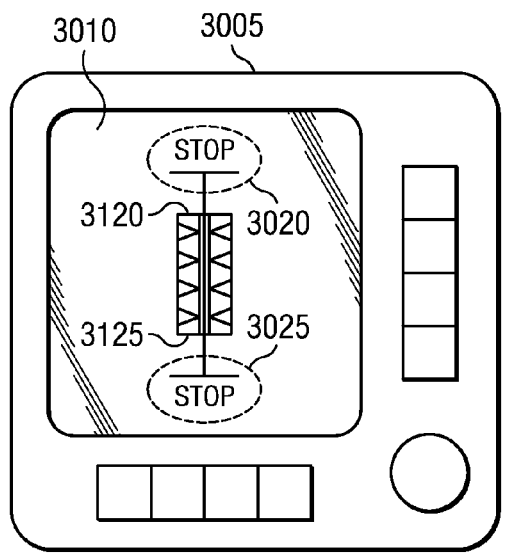
FIGS. 31 and 32 show the progression of the views experienced by an operator the proper parking position is approached.
Figure 32:
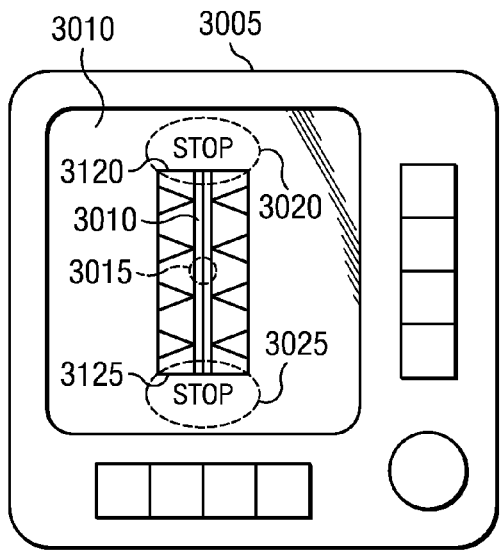

FIGS. 31 and 32 show the progression of the views experienced by an operator the proper parking position is approached. When the vehicle is at a distance from the final parking space, as shown in FIG. 32, a distance separates the stop cues 3125 and the top and bottom stop reference lines 3020, 3025. The operator maintains the alignment of vehicle reference line 3015 and line 3110. When the operator reaches the proper stop point, the stop cues 3125 are aligned with the top and bottom stop reference lines 3020, 3025, as shown in FIG. 32. Although not shown, if the vehicle reference line 3015 and line 3110 become misaligned during the parking procedure, then vehicle reference line 3015 will stray into steer left or steer right cues 3115, 3120 indicating to the operator to steer one way or the other according to the directions that the chevrons point.

Figure 7A:
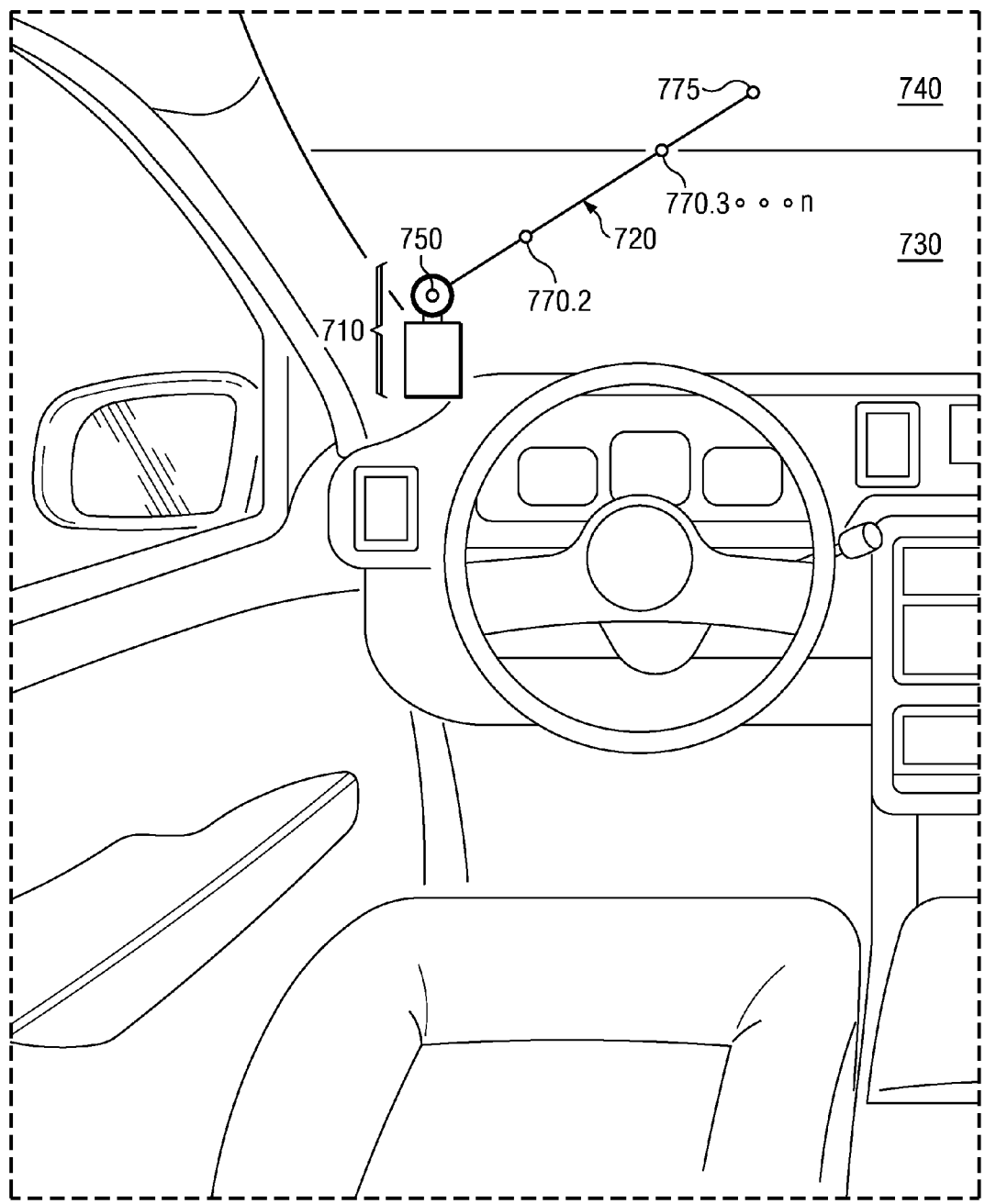

An additional embodiment of the present invention is shown in FIGS. 7A-7C. In this embodiment, it is contemplated that an optical instrument 710 with reduced parallax or entirely without parallax, which may be a gun sight as set forth above, a heads up display or other optical instrument, be installed within a vehicle 700, preferably adjacent to or near the vehicle's steering wheel. In this embodiment, the optical instrument 710 includes an optic symbology projection point 750 that can be aligned with and superimposed over an azimuth guidance track 720 so that the vehicle 700 may be accurately and precisely guided by the operator 760. In this embodiment, the azimuth guidance track 720 can be an infinitely long, straight curve that contains an infinite number of points, but in practice will end at a termination point 775. The azimuth guidance track 720 linearly connects an infinite series of visual cues 770.1, 770.2, 770.3 . . . n, which may exhibit varying visual properties and may be reflecting, illuminating, projecting or contrasting. Reflecting visual cues may include parabolic-shaped light reflectors, prism reflectors, mirrors or other objects exhibiting the characteristic of reflecting light. Illuminating visual cues include objects such as lamps that generate, supply or emit light. Projecting visual cues are light patterns emitted from a projection device such as a projector or laser, projecting onto a surface within the operator's field of view. Contrasting visual cues are differences in visual properties that make an object distinguishable from other objects and the background. Contrasting visual cues are typically determined by the difference in the hue, saturation or value of the object and other objects within the same field of view. For purposes of illustration, FIG. 7A shows visual cues 700.2, 700.3 that appear along and are connected by azimuth guidance track 720. It is important to note that in this embodiment, azimuth guidance track 720 may or may not be visually discernable, as long as all visual cues and the termination point are aligned properly and the operator can align the optic symbology projection point 750 with the visual cues and termination point. For purposes of illustration, the azimuth guidance track 720 is visually discernible in FIGS. 7A-7C.

In FIG. 7A, the azimuth guidance track 720 projects along a floor 730 and onto a wall 740. Floor 730 is a horizontal plane substantially perpendicular to a vertical plane made by wall 740. Floor 730 and wall 740 intersect at substantially a 90 degree angle. As the azimuth guidance track 720 projects onto the wall 740 in FIG. 7A, the vanishing point of the azimuth guidance track 720 adjusts properly to account for the angle created by the wall 740 and the termination point 775 located on the wall 740 is adjusted accordingly. Consequently, to the naked eye the termination point 775 will not appear directly in line with visual cues located on the floor 730.

During initial setup in FIGS. 7A-7C, the operator 760 aligns the optic symbology projection point 750 with the visual cue 700.1 and confirms that the optic symbology projection point 750 directly superimposes over visual cue 700.1, which is located on the azimuth guidance track 720. After proper alignment, the operator 760 may begin operation and guidance of the vehicle 700, which for purposes of this embodiment, is to park the vehicle 700.

FIG. 7A shows the operator's view from inside the vehicle 700. FIG. 7B shows a side view of the operator 760 inside the vehicle 700. FIG. 7C shows a top view of the operator inside the vehicle 700. In addition, FIGS. 7B and 7C show a solid visual line of superimposition 780 indicating the line of sight of operator 760 through the optical instrument 710 to visual cue 770.1.

During operation, the operator 760 directs the vehicle 700 to advance forward by depressing the vehicle's accelerator. As the operator 760 advances the vehicle 700 forward, the operator confirms that the optic symbology projection point 750 maintains continual superimposition upon azimuth guidance track 720 in a direct path towards visual cue 770.2. In the embodiment shown in FIGS. 7A-7C, as the vehicle 700 proceeds forward, the optic symbology projection point 750 follows a substantially identical parallel plane to the plane containing azimuth guidance track 700. After the vehicle 700 travels a sufficient distance, optic symbology projection point 750 should directly superimpose upon visual cue 770.2. If optic symbology projection point 750 does not directly superimpose upon visual cue 770.2, this will indicate to the operator 760 that the vehicle 700 is not properly aligned and that an adjustment to the direction of travel of the vehicle 700 or an adjustment to the alignment of the optical instrument 710 should occur. To ensure proper alignment of the vehicle 700, the operator 760 should seek to continually align and superimpose optic symbology projection point 750 upon and along azimuth guidance track 720.

It is contemplated that in FIGS. 7A-7C, as the vehicle 700 continues to proceed forward past visual cue 770.2, optic symbology projection point 750 proceeds along the azimuth guidance track 720 as the optic symbology projection point 750 approaches visual cue 770.3. As above, after the vehicle 700 travels a sufficient distance, optic symbology projection point 750 should directly superimpose upon visual cue 770.3. If optic symbology projection point 750 does not directly superimpose upon visual cue 770.3, this will indicate to the operator 760 that the vehicle 700 is not properly aligned and that an adjustment to the direction of travel of the vehicle 700 or an adjustment to the alignment of the optical instrument 710 should occur. Again, to ensure proper alignment of the vehicle 700, the operator 760 should seek to continually align and superimpose optic symbology projection point 750 upon and along azimuth guidance track 720.

Also shown in FIGS. 7A-7C is the termination point 775 of azimuth guidance track 720. The termination point 775 may be indicated by any predetermined visual cue, which may be reflecting, illuminating, projecting, or contrasting as outlined above. After the vehicle 700 proceeds past visual cue 770.3, the optic symbology projection point 750 proceeds, continually superimposing the azimuth guidance track 720 as the optic symbology projection point 750 approaches termination point 775. When the vehicle 700 travels a sufficient distance, prior to optic symbology projection point 750 aligning with termination point 775, the operator 760 prepares to take the necessary steps to stop forward movement of the vehicle 700, including preparing to disengage any of the operational mechanisms. When optic symbology projection point 750 aligns with termination point 775 of azimuth guidance track 720, the operator 760 stops forward movement of the vehicle 700 and vehicle guidance pursuant to this embodiment is complete.

Figure 8A:
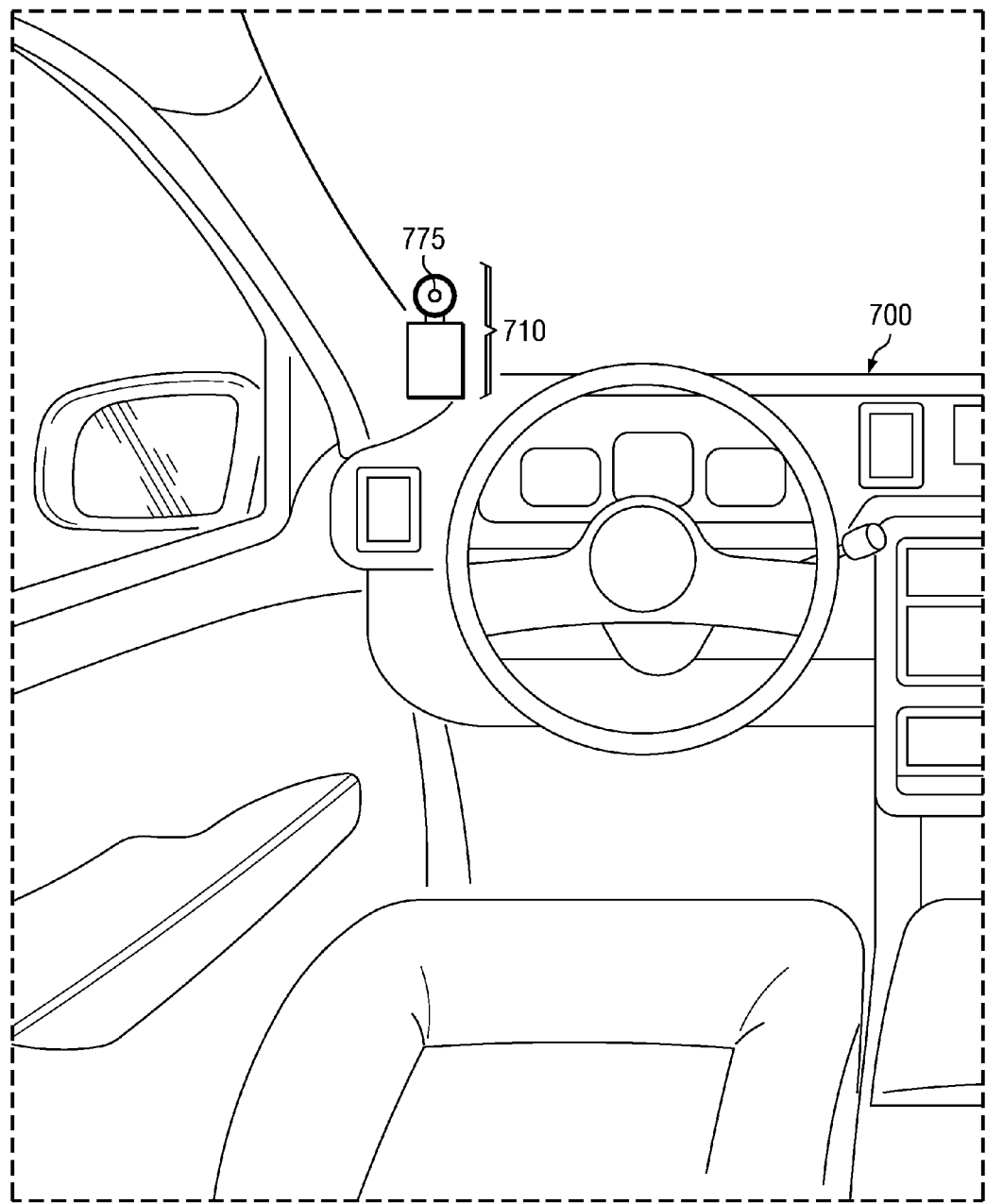
Figure 8B:
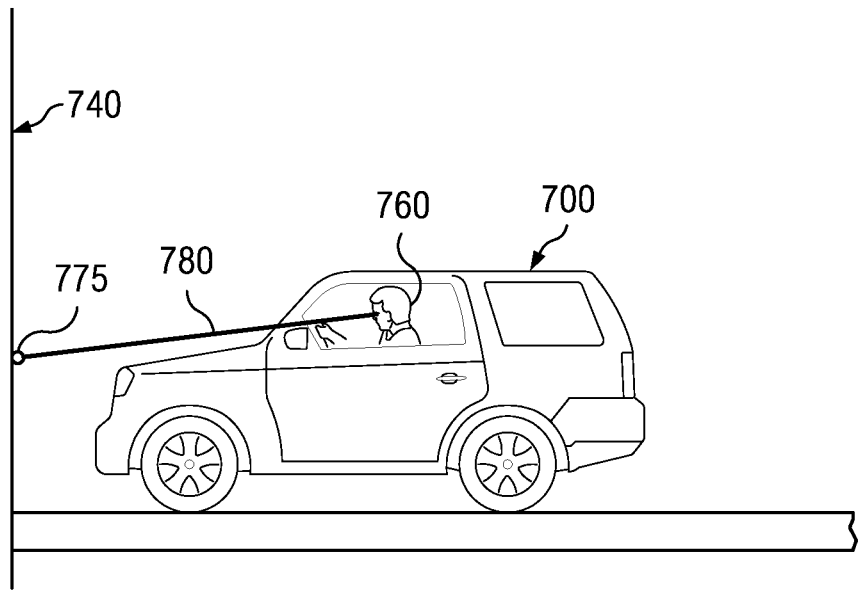
Figure 8C:
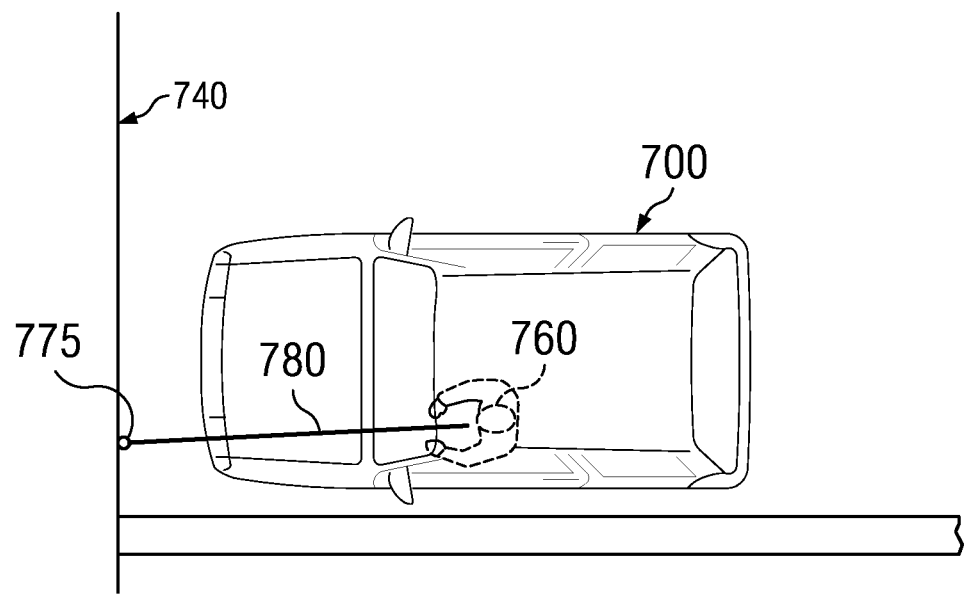

FIGS. 8A-8C show the embodiment according to FIGS. 7A-7C and further show a position of the vehicle 700 when the optic symbology projection point 750 aligns with termination point 775 and the vehicle 700 has completely stopped.

An embodiment according to the present invention as shown in FIGS. 9-13 utilizes a "heads-up display" for a vehicle guidance system and method. A heads-up display is commonly known as a transparent display that projects and displays data in front of an operator without requiring the operator to look away from the operator's usual viewpoint. A heads-up display utilizes collimated imaging to focus the operator's view at infinity. This imaging provides only a limited parallax or no parallax to the operator. A heads-up display may be used in automobiles, aircraft, farm machinery or other similar motorized vehicles.

4.1.3. Other Land Vehicles

A vehicle guidance system as described above may be adapted to function with lawn mowers. Lawn mowers systems will function in a substantially similar way to that is described in relation to tractors. Additionally, the guidance system may be adapted to function with cargo vehicles such as forklifts. In this case, a variety of azimuth guidance cues are used including the lines of existing palates or boxes. Due to a guidance system, the operator may more quickly align the placement of boxes in relation to other boxes (or palates). A heads up display as described in relation to the second embodiment may be used as well as the other systems described.

4.2. Aircraft

Figure 18:
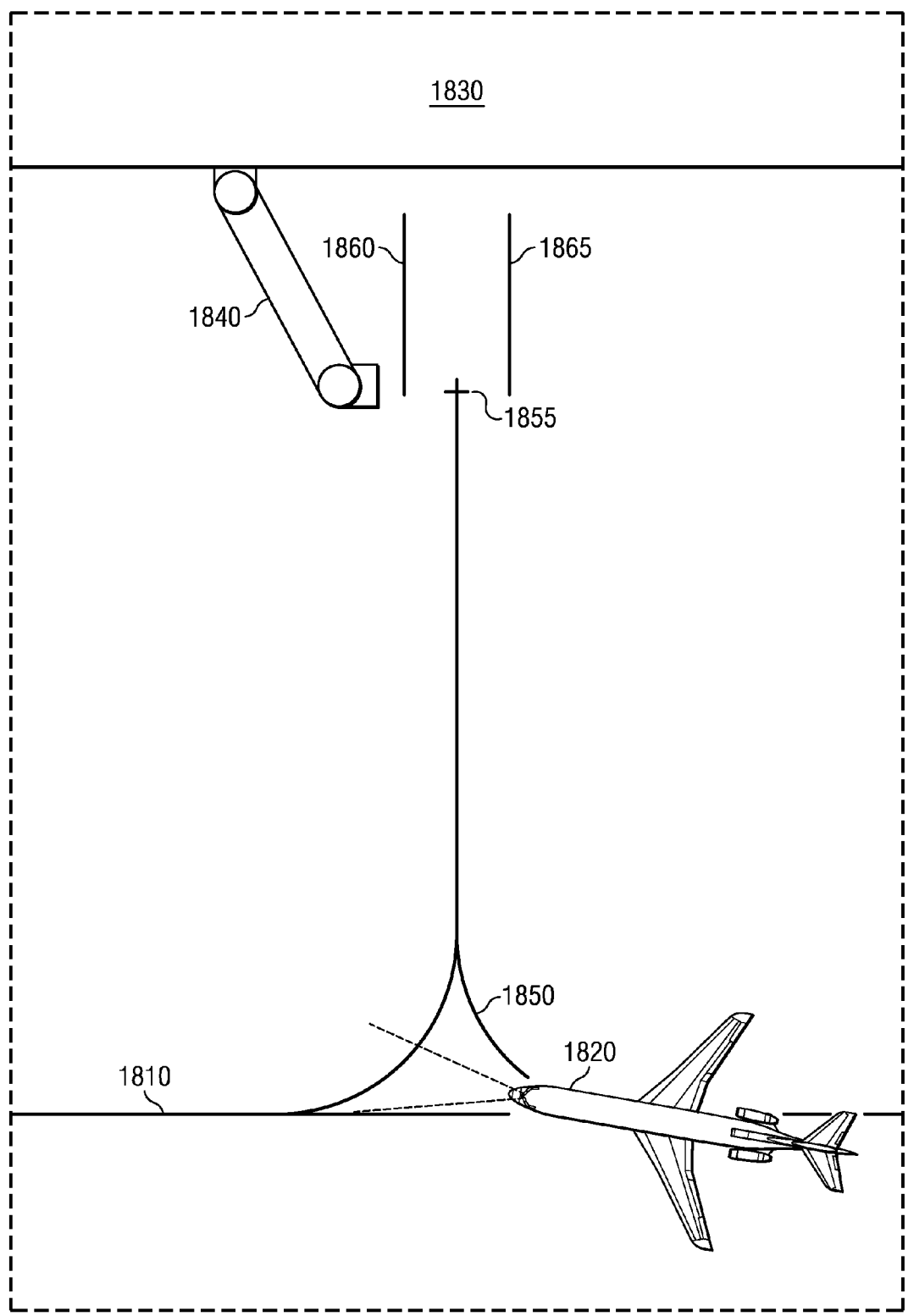
FIGS. 18-24 show different views of another embodiment of a vehicle guidance system and method.

FIGS. 18-24 show a vehicle guidance system for usage with an aircraft. In this embodiment the guidance system is implemented using a heads-up display as described previously, however alternative displays may be used as described above. In FIG. 18, the standard airport taxiway centerline 1810 marking is used by the pilot to guide the aircraft 1820 during ground operations between the runway and the terminal. At the terminal building 1830 there are is at least one aircraft docking bridge 1840. The guidance system may also be used in conjunction with a de-icing area, in order to align the aircraft in the de-icing area. The usage of the previously described infrared guidance cues is well adapted for use with a de-icing area since visible cues may be obscured by ice or snow. In order to position the airplane 1820 with the aircraft docking bridge 1840, the pilot follows the centerline until reaching a lead-in line 1850. The pilot then maneuvers the aircraft 1820 along lead-in line 1850. When nearing the aircraft docking bridge, the pilot receives instructions from ground crew in order to properly align airplane 1820. The objective is to position the front wheel of the aircraft to stop bar 1855. Instead of using ground crew, the present system relies on guidance cues 1860, 1865, as will be explained further.

Figure 19:
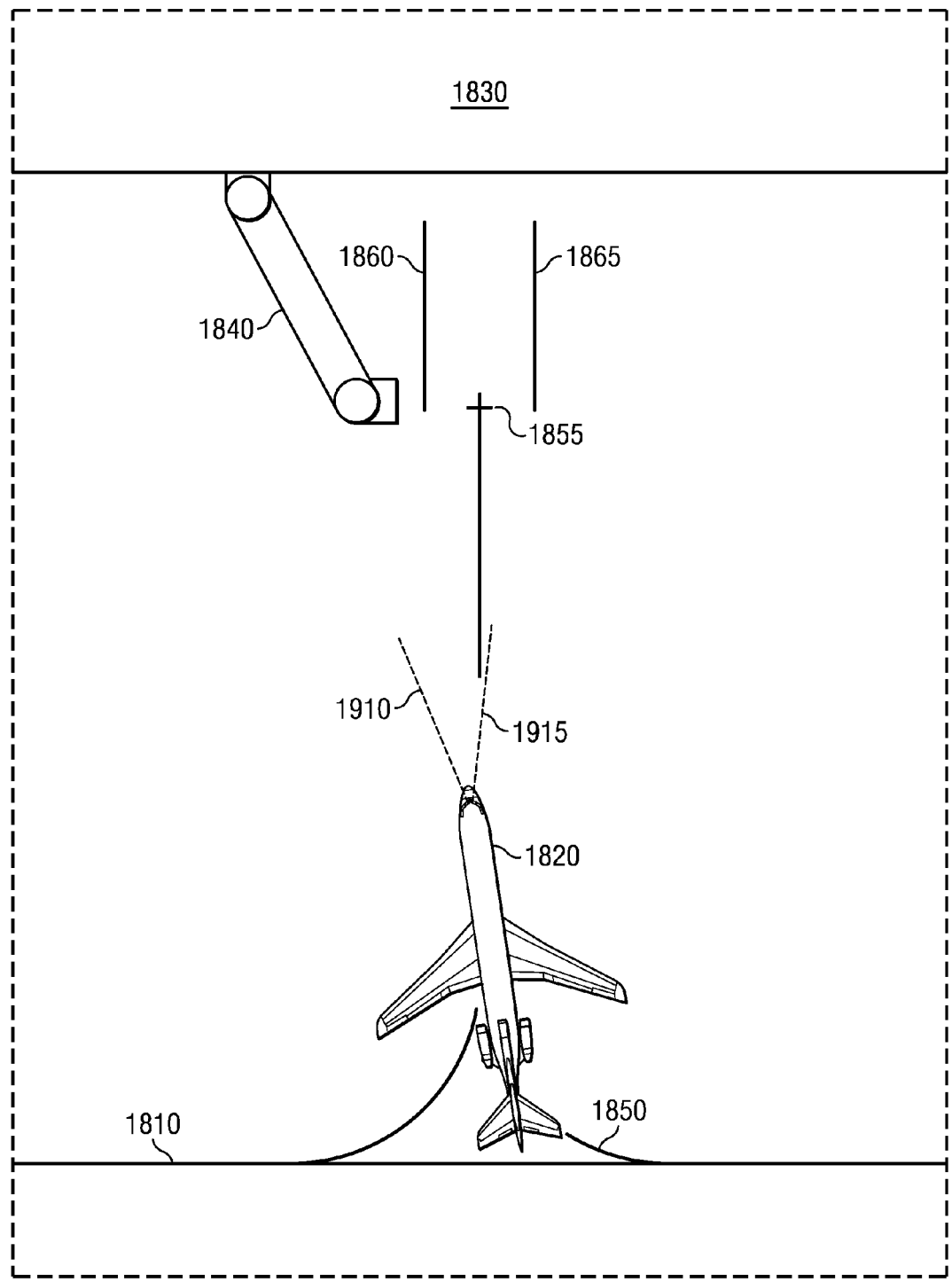
Figure 20:
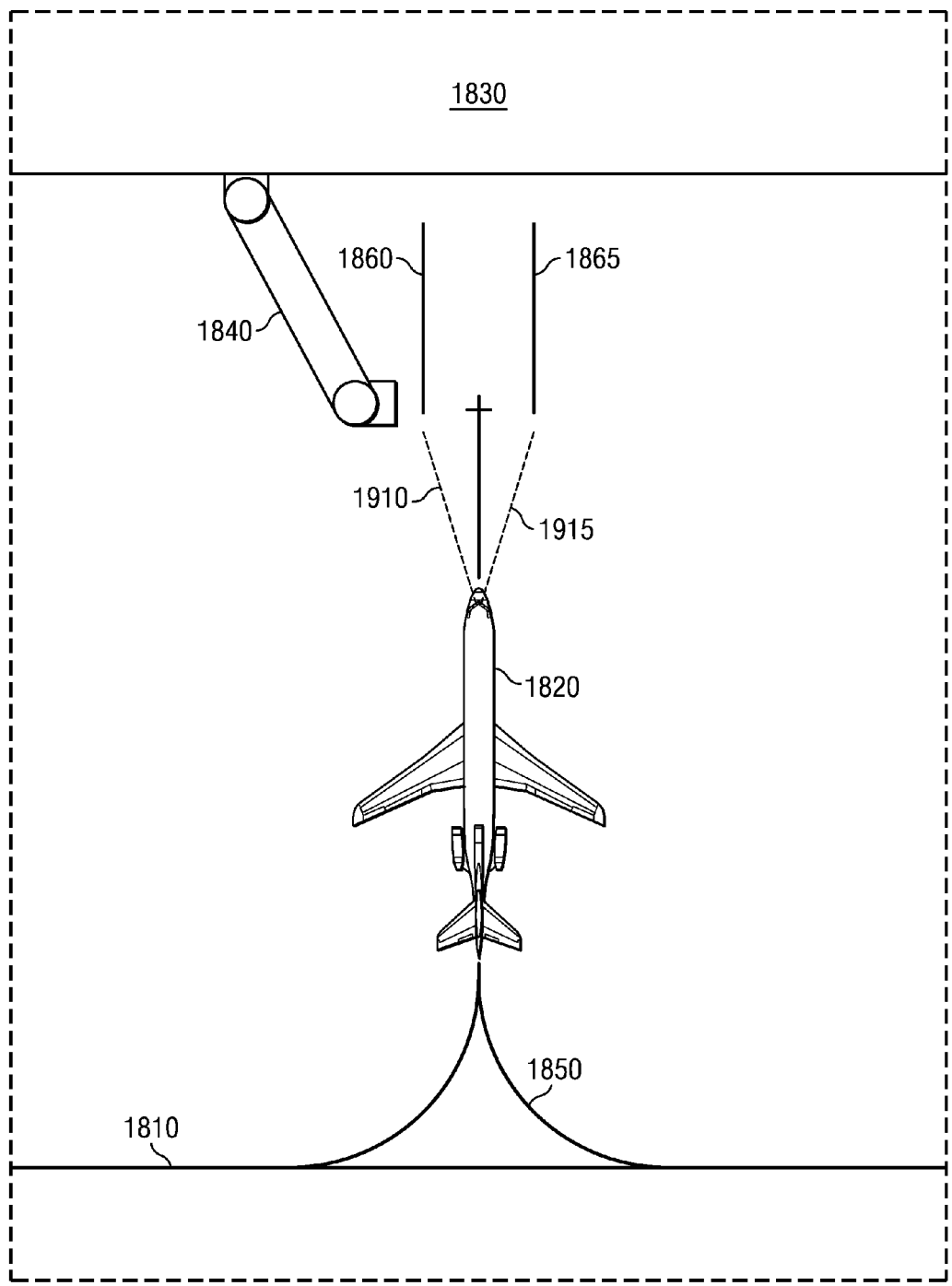
Figure 21:
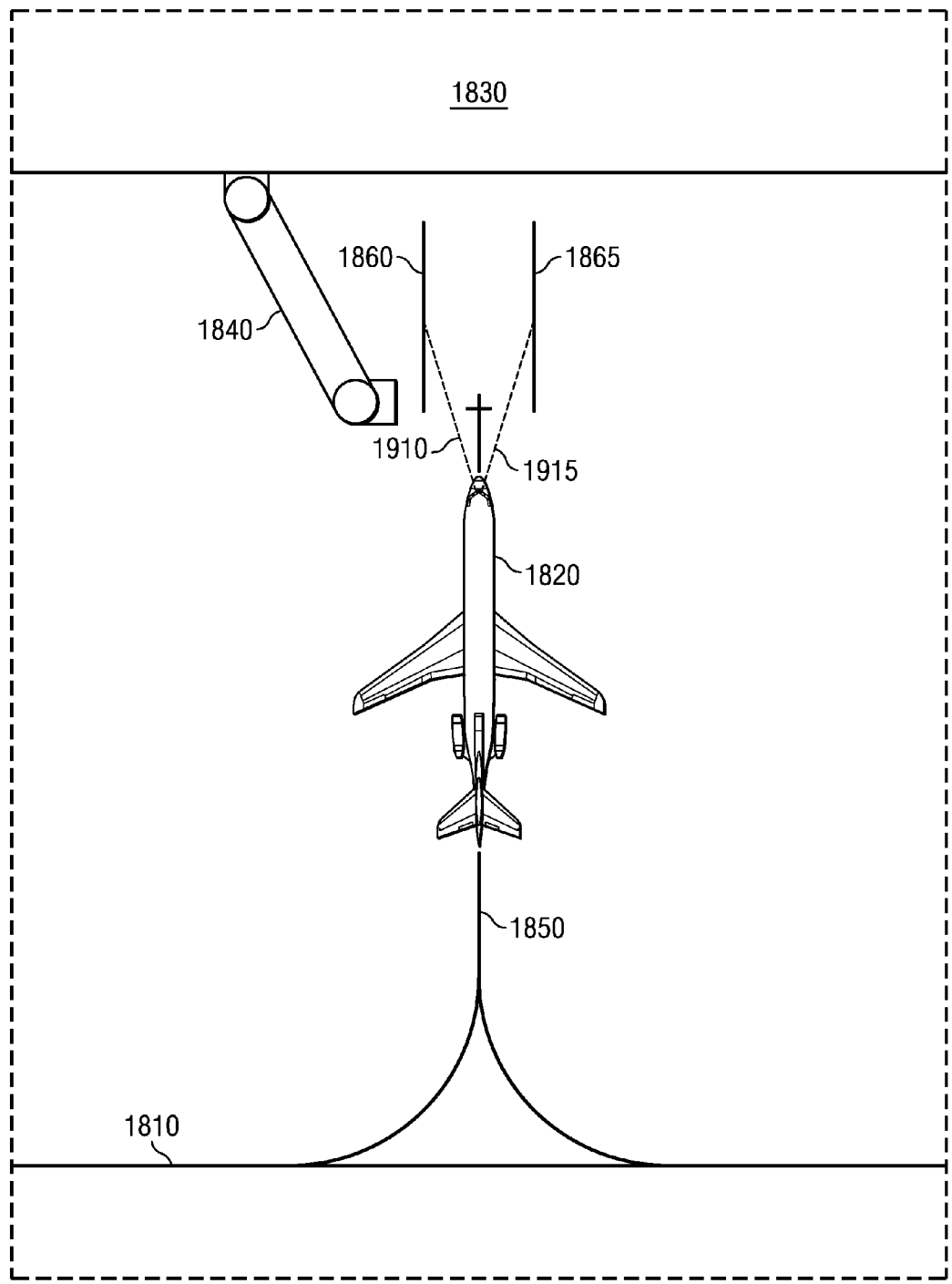
Figure 22:
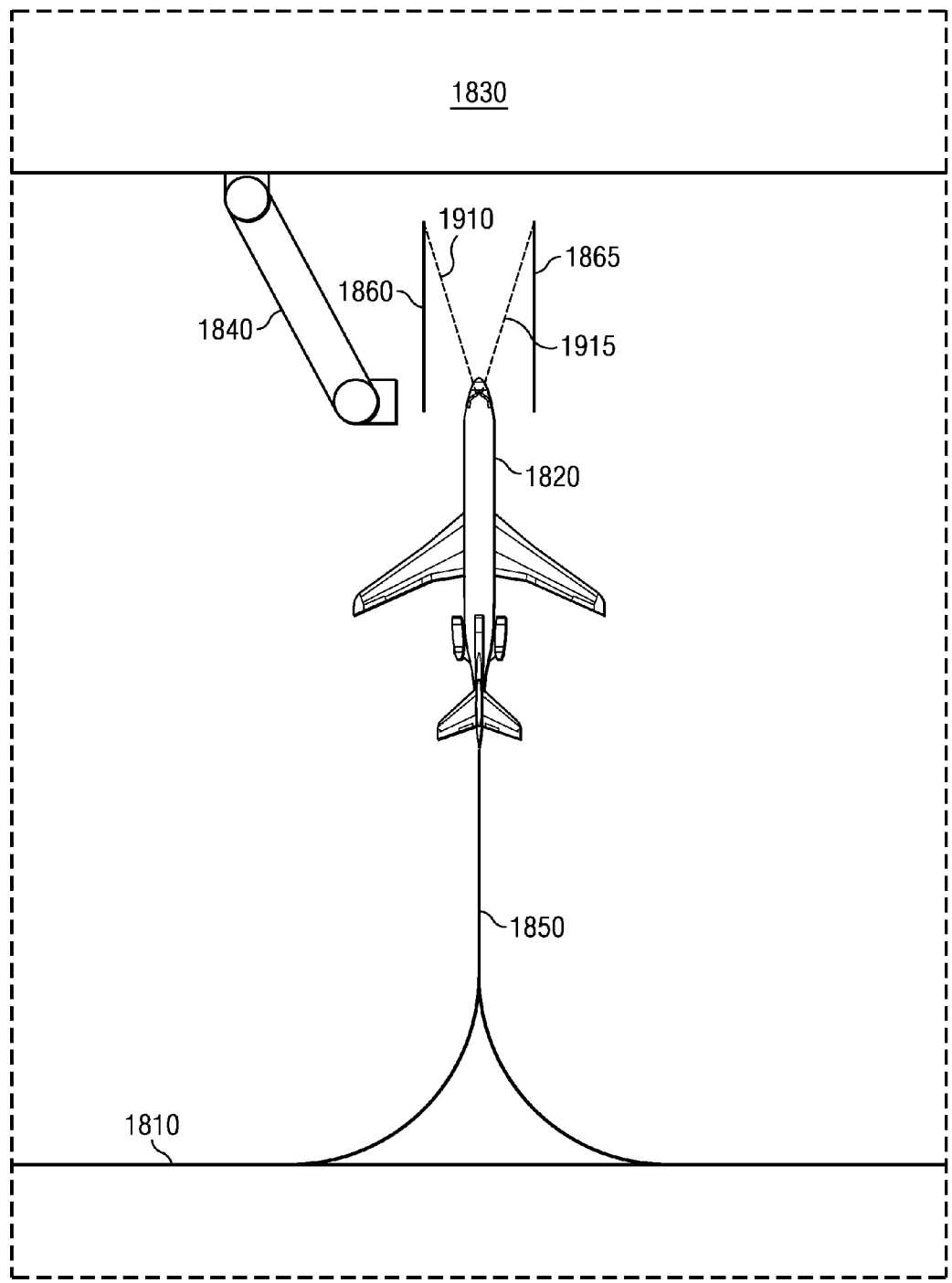

In FIG. 19 the aircraft 1820 has progressed along lead-in line 1850. Left symbology projection 1910 and right symbology projection 1915 are visible to the pilot through the heads-up display in the cockpit. As the aircraft 1820 turns, the pilot steers in order line ups the left symbology projection 1910 and right symbology projection 1915 with the guidance cues 1860, 1865. In FIG. 20, the aircraft 1820 has completed the turn on the lead-in line 1850 and the pilot has lined up the left symbology projection 1910 and right symbology projection 1915 with the guidance cues 1860, 1865. As the aircraft 1820 further progresses, as shown in FIG. 21, the pilot maintains alignment of the left symbology projection 1910 and right symbology projection 1915 with the guidance cues 1860, 1865. As the aircraft 1820 approaches terminal 1830 the guidance cues 1860, 1865 come to an end. The end of the guidance cues 1860, 1865 is marked with a stop position cue that is discussed in more detail in relation to FIG. 23. The aircraft 1820 is stopped when the left symbology projection 1910 and right symbology projection 1915 intersect the stop position cues. This locates the front wheel of aircraft 1820 directly over stop bar 1855, which is the proper position for alignment with aircraft docking bridge 1840.

Figure 23:
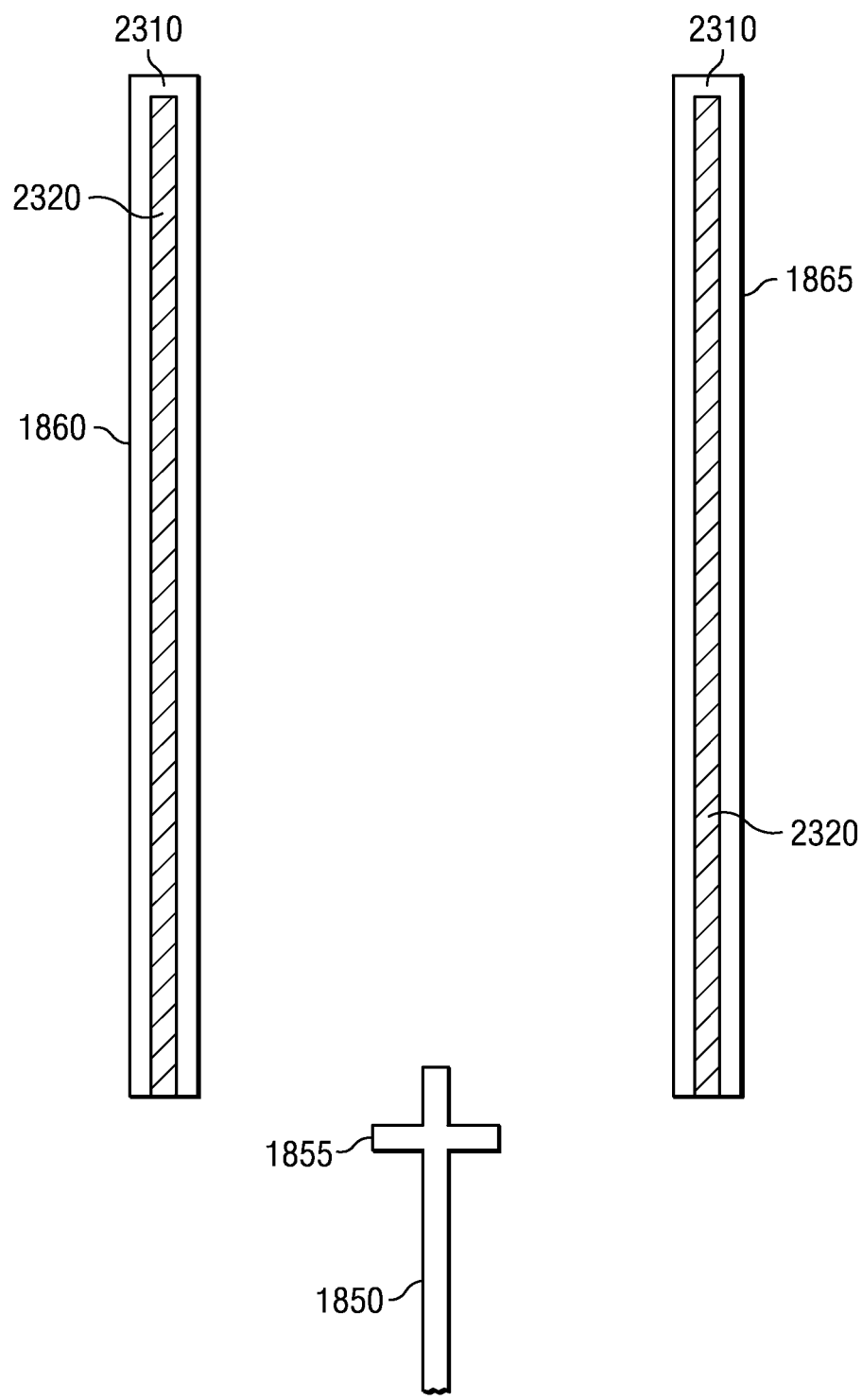
Figure 24:
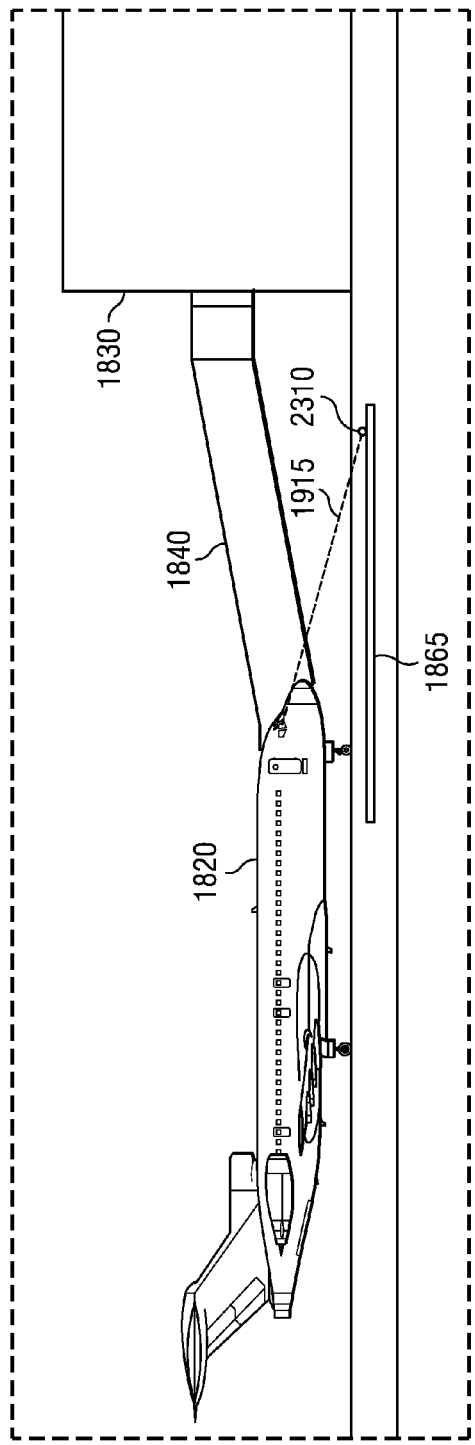

FIG. 23 shows a not to scale portion of the azimuth guidance cues and the lead-in line 1850 and stop bar 1855. The guidance cues 1860, 1865 have a red portion 2310 and a green portion 2320. As the pilot lines up the left symbology projection 1910 and right symbology projection 1915 with the guidance cues 1860, 1865 when the green portion 2320 is lined-up it indicates that the alignment is good. When the alignment starts to fade to the red portion 2310, it indicates that the aircraft 1820 is becoming misaligned. FIG. 24 shows a side view of the end result of a parking procedure.

This system and method can substantially reduce the negative effects of lightning events for airlines and their customers resulting in a Significant cost savings. An additional benefit of this system and method is a reduction in the carbon footprint. The possibility also exists that this system and method can be made compliant with the ICAO Annex 14-Aerodromes, 5.3.24 Visual docking guidance system.

Requirements of the ICAO Annex 14-Aerodromes, 5.3.24 Visual docking guidance system include both azimuth and stopping guidance (5.3.24.4). As is clear from the red portion 2310 and the green portion 2320 the guidance system includes these features. In the case of a heads-up display, as long as the display is lit, malfunction is unlikely. If the display is not lit, then there is an indication of malfunction (5.3.24.5). The guidance cues 1860, 1865 are located close to the stand center line (5.3.24.10). The heads-up display is easily oriented to be performed for either pilot (5.3.24.11). The system provides unambiguous indications of how to align the aircraft (5.3.24.12). Green indicates alignment and red indicates that the path of the aircraft is deviating (5.3.24.13). The pilot can observe the cues in the heads-up display and the guidance unit without turning the head (5.3.24.14). With the addition of a processor to the system, the processor monitors the position of the aircraft in relation to the guidance cues and continually calculates the distance from the red portion 2310 stop indicator and the alignment with the guidance cues. This information is indicated to the operator using visual and/or audio signals as described above. Indications for a gradual slow down are provided to the pilot (5.3.24.18) by indicating a recommended speed according to how close the aircraft is from the stopping point. In one alternative, a yellow caution cue is provided to indicate proximity to the stop point (5.3.24.20).

Figure 25:
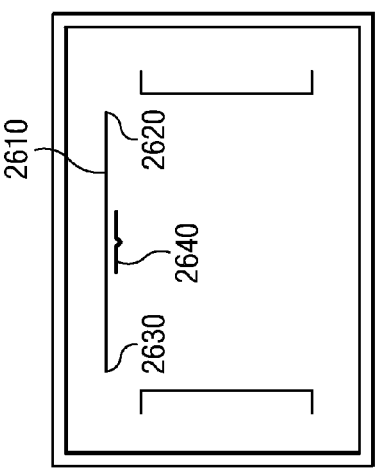
FIG. 25 shows one embodiment of parallax limited symbology for a viewing device.

FIG. 25 shows one embodiment of parallax limited symbology for a viewing device, such as a heads-up display or a camera and monitor system. The symbology includes a horizon reference line, having a right end 2620 and a left end 2630 and an aircraft reference 2640.

Figure 26:
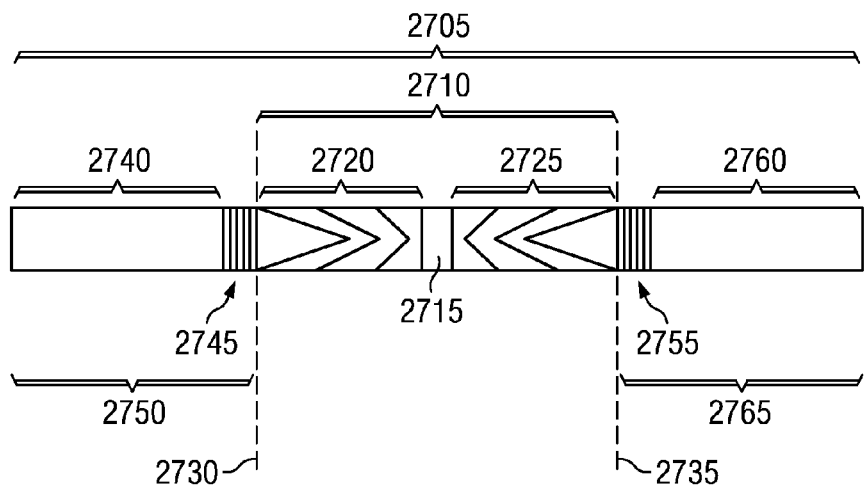
FIG. 26 shows an embodiment of a parking guidance cue.
Figure 27:
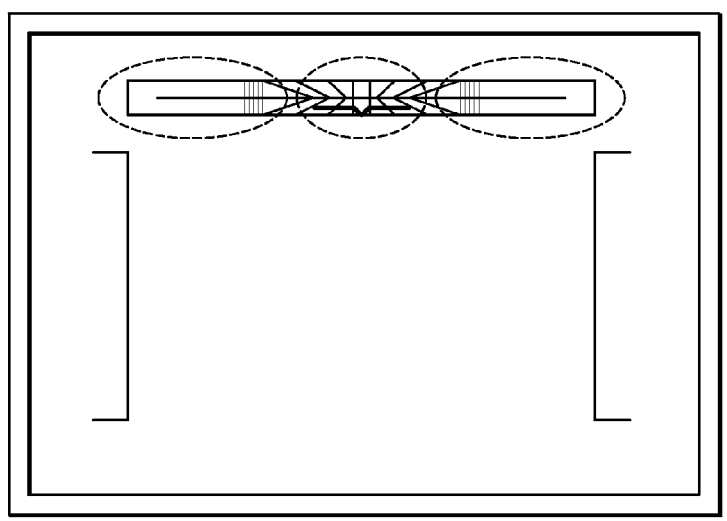
FIG. 27 shows a system combining the parallax limited symbology and parking guidance cue.
Figure 28:
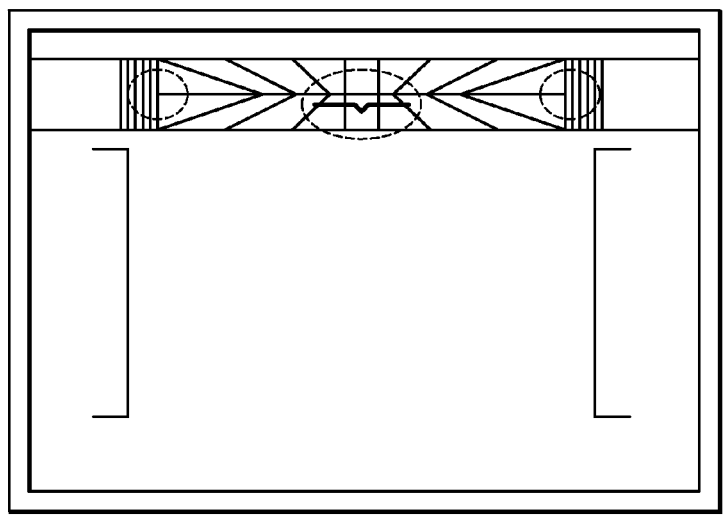
FIG. 28 shows the change in the image of FIG. 28 viewed after the aircraft has advanced.

FIG. 26 shows an embodiment of parking guidance unit 2705 consisting of the azimuth guidance cue 2710 consisting of green lead-in line-up cue 2715 and steer right cue 2720 and steer left cue 2725, both have a red field with yellow chevrons, indicating the direction to steer. Parking guidance unit 2705 further consist of rate progression cues 2750 and 2765 which include respectively green cues 2740 and 2760 and red cues 2745 and 2755 and red stop cue 2730 and 2735. FIG. 27 shows the combined system. The parking guidance unit appears to get larger from the perspective of the operator. The operator maintains alignment by keeping the aircraft ref 2640 superimposed with azimuth guidance cue 2715 using steer right cue 2720 and steer left cue 2725. FIG. 28 shows the operator view of the stopped position noting the horizon reference line 2610 right end 2620 is even with stop cue 2735 and left horizon reference line 2610 left end 2630 is even with stop cue 2730.

Figure 9:
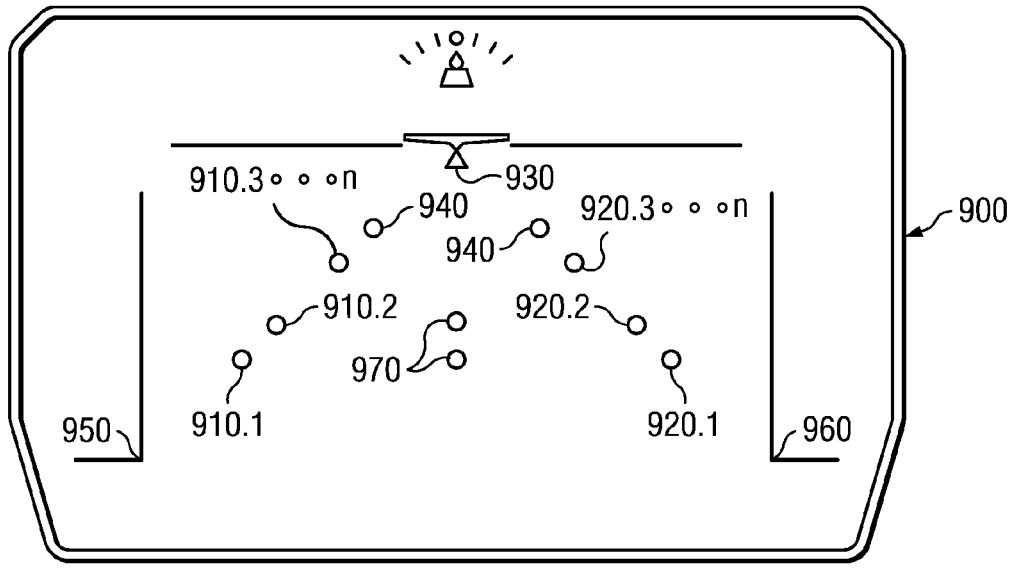
FIG. 9 shows another embodiment of a vehicle guidance system and method including a heads-up display.

FIGS. 9-13 show a heads-up display 900 that includes a bore sight 930, a left-oriented optic symbology alignment facilitator 950 and a right oriented optic symbology alignment facilitator 960. Also shown on FIG. 9 are visual alignment cues 970, left azimuth guidance cues 910.1, 910.2, 910.3 . . . n (which may be numbered to infinity), right azimuth guidance cues 920.1, 920.2, 920.3 . . . n (which may be numbered to infinity), and left and right termination points 940. Visual alignment cues 970, left azimuth guidance cues 910.1, 910.2, 910.3 . . . n, right azimuth guidance cues 920.1, 920.2, 920.3 . . . n, and left and right termination points 940 may exhibit varying visual properties and may be reflecting, illuminating, projecting or contrasting. Reflecting visual cues may include parabolic shaped light reflectors, prism reflectors, mirrors or other objects exhibiting the characteristic of reflecting light. Illuminating visual cues include objects such as lamps that generate, supply or emit light. Projecting visual cues are light patterns emitted from a projection device such as a projector or laser, projecting onto a surface within the operator's field of view. Contrasting visual cues are differences in visual properties that make an object distinguishable from other objects and the background. Contrasting visual cues are typically determined by the difference in the hue, saturation or value of the object and other objects within the same field of view. In addition, each of visual alignment cues 970, left azimuth guidance cues 910.1, 910.2, 910.3 . . . n, right azimuth guidance cues 920.1, 920.2, 920.3 . . . n and termination points 940 may be exhibited in, may reflect or may emit varying colors. For purposes of illustration herein, visual alignment cues 970 preferably emit a green color, left azimuth guidance cues 910.1, 910.2, 910.3 . . . n and right azimuth guidance cues 920.1, 920.2, 920.3 . . . n preferably emit a yellow color and termination points 940 preferably emit a red color. Visual alignment cues 970, left azimuth guidance cues 910.1, 910.2, 910.3 . . . n, right azimuth guidance cues 920.1, 920.2, 920.3 . . . n and termination points 940 are pre-positioned.

In FIG. 9, the heads-up display is oriented directly in front of the operator in the vehicle, where the operator can easily look through the heads-up display to operate the vehicle. During initial setup of this embodiment of the present invention, the operator visually aligns bore sight 930 with the visual alignment cues 970. This will serve to also align bore sight 930 with left azimuth guidance cues 910.1, 910.2, 910.3 . . . n, left termination point 940 and the left-oriented optic symbology alignment facilitator 950. Bore sight 930 will also be aligned with right azimuth guidance cues 920.1, 920.2, 920.3 . . . n, right termination point 940 and the right-oriented optic symbology alignment facilitator 960. After all are aligned in such manner, the operator begins guidance of the vehicle.

Figure 10:
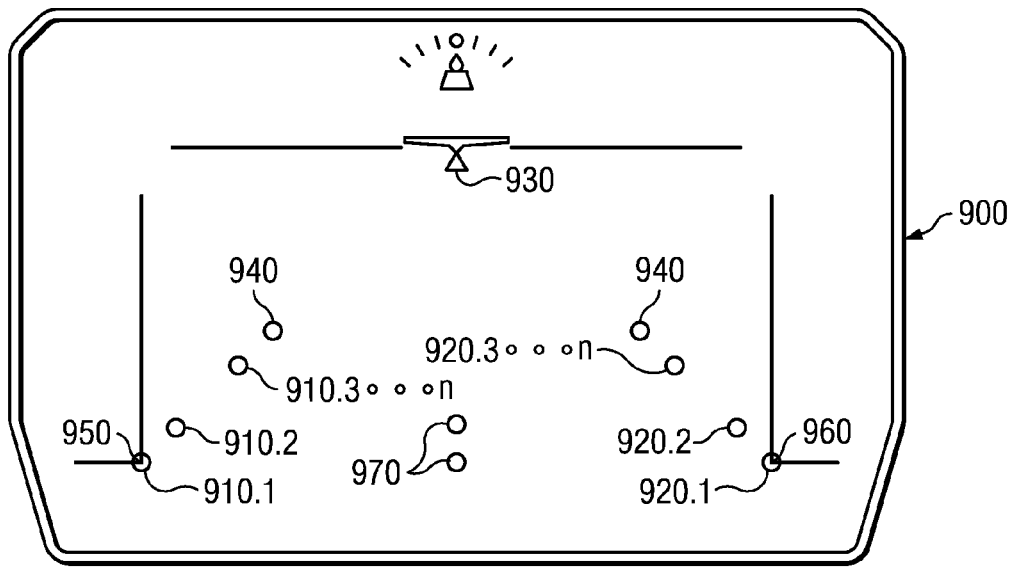
FIGS. 10-13 show different views of the vehicle guidance system and method of FIG. 9.

During operation as shown in FIGS. 10-13, and as specifically shown in FIG. 10, the operator directs the vehicle to advance forward towards visual alignment cues 970. The operator advances the vehicle forward a sufficient distance until the left azimuth guidance cue 910.1 intersects with the left oriented optic symbology alignment facilitator 950 and the right azimuth guidance cue 920.1 intersects with the right oriented optic symbology alignment facilitator 960. If the left azimuth guidance cue 910.1 does not intersect with the left oriented optic symbology alignment facilitator 950 or the right azimuth guidance cue 920.1 does not intersect with the right oriented optic symbology alignment facilitator 960, this will indicate to the operator that the vehicle is not properly aligned and that an adjustment to the direction of travel of the vehicle should immediately occur.

Figure 11:
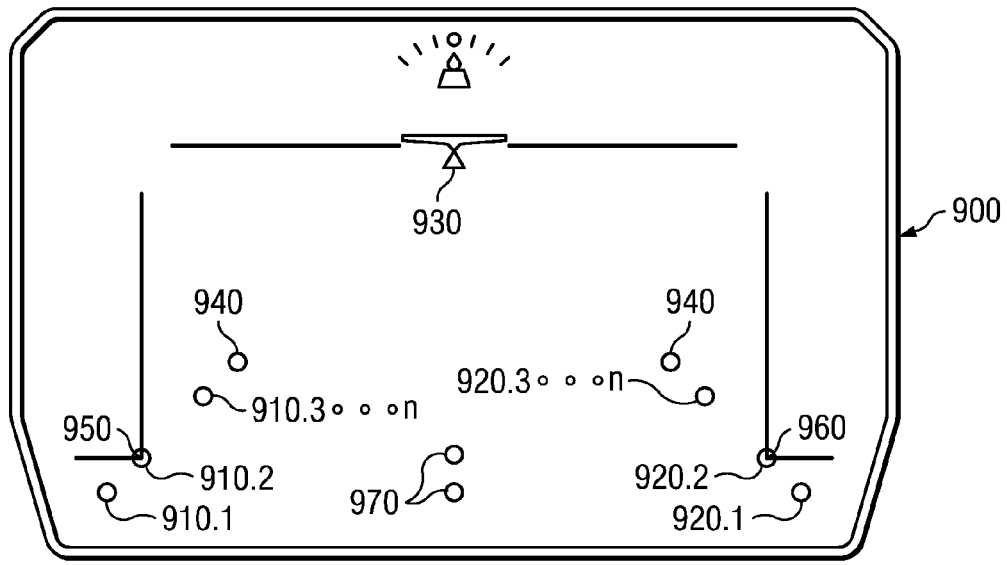

FIG. 11 shows that the operator advances the vehicle forward a sufficient distance until the left azimuth guidance cue 910.2 intersects with the left oriented optic symbology alignment facilitator 950 and the right azimuth guidance cue 920.2 intersects with the right oriented optic symbology alignment facilitator 960. If the left azimuth guidance cue 910.2 does not intersect with the left oriented optic symbology alignment facilitator 950 or the right azimuth guidance cue 920.2 does not intersect with the right oriented optic symbology alignment facilitator 960 as shown on FIG. 11, this will indicate to the operator that the vehicle is not properly aligned and that an adjustment to the direction of travel of the vehicle should immediately occur.

Figure 12:
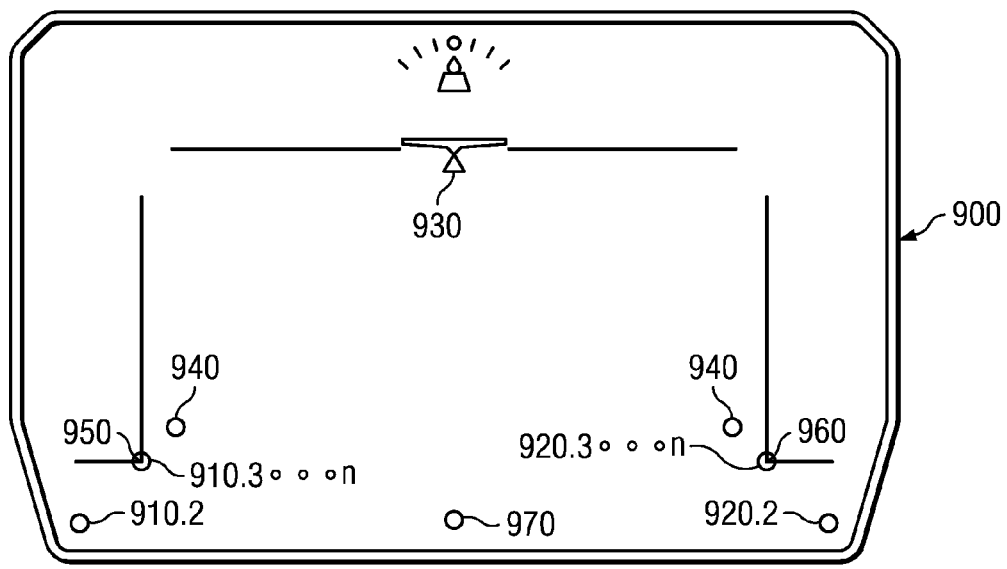

FIG. 12 shows that the operator advances the vehicle forward a sufficient distance until the left azimuth guidance cue 910.3 intersects with the left oriented optic symbology alignment facilitator 950 and the right azimuth guidance cue 920.3 intersects with the right oriented optic symbology alignment facilitator 960. If the left azimuth guidance cue 910.3 does not intersect with the left oriented optic symbology alignment facilitator 950 or the right azimuth guidance cue 920.3 does not intersect with the right oriented optic symbology alignment facilitator 960 as shown on FIG. 12, this will indicate to the operator that the vehicle is not properly aligned and that an adjustment to the direction of travel of the vehicle should immediately occur.

Figure 13:
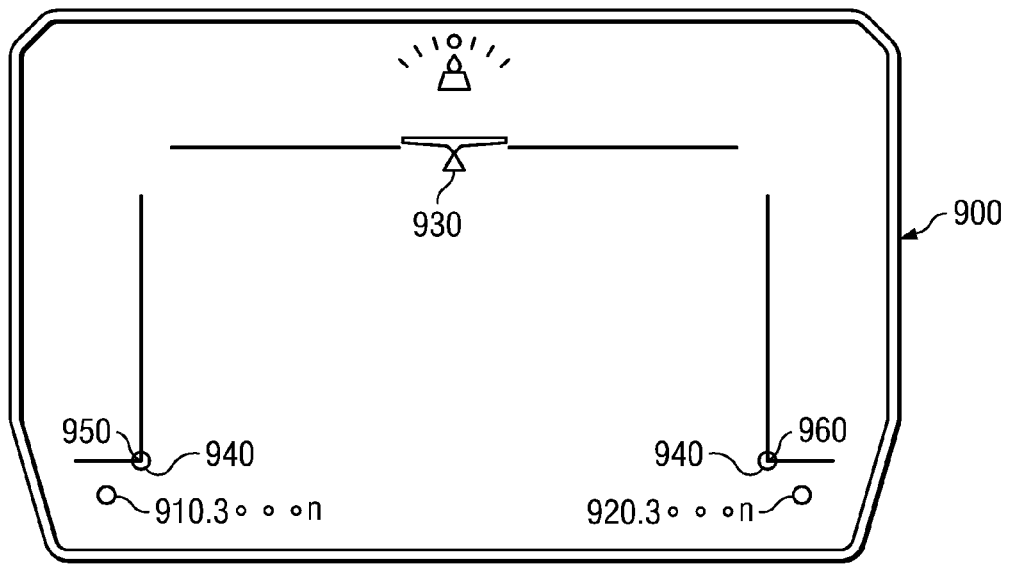

After the intersections of the left azimuth guidance cue 910.3 with the left-oriented optic symbology alignment facilitator 950 and the right azimuth guidance cue 920.3 with the right-oriented optic symbology alignment facilitator 960, FIG. 12 shows the advancement of the vehicle towards termination points 940. After the vehicle travels past the left azimuth guidance cue 910.3 and the right azimuth guidance cue 920.3, the operator prepares to take the necessary steps to stop forward movement of the vehicle, including preparing to disengage any of the operational mechanisms. As shown in FIG. 13, when left termination point 940 intersects with the left oriented optic symbology alignment facilitator 950 and the right termination point 940 intersects with the right oriented optic symbology alignment facilitator 960, the operator stops forward movement of the vehicle and vehicle guidance pursuant to this embodiment is complete.

Although the present invention has been described with reference to specific embodiments, this description is not meant to be construed in a limited sense. Various modifications of the disclosed embodiments, as well as alternative embodiments of the present invention will become apparent to persons skilled in the art upon the reference to the description of the present invention.

I claim:

1. A method for aligning a vehicle, the method comprising:
 (a) providing an optical instrument, mounted in the vehicle, the optical instrument providing an image viewable from the vehicle's standard operating position by an operator and the image including a symbolic optical projection;
 (b) providing an azimuth guidance cue in the operation area of the vehicle, wherein the azimuth guidance cue has a first portion and a second portion, the first portion indicating that the alignment is good and the second portion indicating that the vehicle is becoming misaligned, the first and second portions having a different hue; and
(c) aligning the symbolic optical projection with the azimuth guidance cue by steering the vehicle.

2. The method of claim 1, wherein the optical instrument is positioned to provide a view from a point of interest.

3. The method of claim 2, wherein the point of interest is sufficiently distant from the operator such that the operators view in relation to the point of interest creates parallax.

4. The method of claim 1, wherein the image is a view from a location remote from the vehicle's standard operating position.

5. The method of claim 4, wherein the image reduces parallax between the location and the vehicle's standard operating position.

6. The method of claim 1, wherein the optical instrument is a gun sight.

7. The method of claim 6, wherein the symbolic optical projection is a retical.

8. The method of claim 1, further comprising:
(d) providing an indication to the operator indicating a direction to steer the vehicle in order to align the symbolic optical projection with the azimuth guidance cue.

9. The method of claim 8, wherein the indication is provided by a computing system receiving the image from the optical device.

10. The method of claim 1, further comprising:
(d) adjusting the direction of the vehicle using a computing device based on the image, wherein the image is provided to the computing device, and the direction is adjusted to follow the azimuth guidance cue.

11. The method of claim 1 wherein the azimuth guidance cue includes a stop position cue at a first end.

12. The method of claim 1, further comprising:
(d) providing a parking guidance unit including a steer right cue, a steer left cue, a left stop cue, and a right stop cue; and
(e) stopping the vehicle when the left stop cue is even with a left side of a horizontal reference line and the right stop cue is even with a right side of a horizontal reference line.

13. A system for aligning a vehicle, the system comprising:
(a) an optical instrument, mounted on the vehicle, the optical instrument providing an image viewable from the vehicle's standard operating position by an operator and the image including a symbolic optical projection;
(b) an azimuth guidance cue, having a path, in the operation area of the vehicle; wherein when the symbolic optical projection is aligned with the azimuth guidance cue the vehicle follows the path of the azimuth guidance cue, and wherein the azimuth guidance cue has a first portion and a second portion, the first portion indicating that the alignment is good and the second portion indicating that the vehicle is becoming misaligned, the first and second portions having a different hue and wherein the azimuth guidance cue includes a stop position cue at a first end.

14. The system of claim 13, further comprising:
(c) a processor that receives signals from the optical instrument.

15. The system of claim 14 wherein the processor determines whether the symbolic optical projection is aligned with the azimuth guidance cue and provides an indication of alignment to the operator.

16. The system of claim 15 wherein the indication of alignment further includes an indication of what direction to steer the vehicle in order to achieve alignment.

17. The system of claim 14, wherein the processor enhances the image by identifying a contrast line between a first and second area, the first and second area having different visual characteristics, the processor further enhancing the image by highlighting the identified contrast line.

18. The system of claim 14 wherein the processor enhances the image by highlighting the azimuth guidance cue.

19. The system of claim 13, wherein the optical instrument includes a camera and a monitor that communicates with the camera.

20. A method for aligning a vehicle, the method comprising:
(a) providing an optical instrument, mounted in the vehicle, the optical instrument providing an image viewable from the vehicle's standard operating position by an operator and the image including a symbolic optical projection, wherein the optical instrument is a bore sight;
(b) providing azimuth guidance cues in the operation area of the vehicle, including a first visual alignment cue that emits a first color, a second visual alignment cue that emits a second color, and a third visual alignment cue that emits the second color and termination points that emit a third color;
(c) aligning the symbolic optical projection with the azimuth guidance cues by steering the vehicle; and
(d) stopping the vehicle when the termination points are aligned with the symbolic optical projections.

21. A method for aligning a vehicle, the method comprising:
(a) providing an optical instrument, mounted in the vehicle, the optical instrument providing an image viewable from the vehicle's standard operating position by an operator and the image including a symbolic optical projection, wherein the optical instrument is a bore sight;
(b) providing an azimuth guidance cue in the operation area of the vehicle, the image including the azimuth guidance cue during alignment; and
(c) aligning the symbolic optical projection with the azimuth guidance cue by steering the vehicle.

22. The method of claim 21, further comprising:
(d) continually calculating the distance to the stop position cue with a processing system; and
(e) providing an indication for gradual slowdown of the vehicle.

* * * * *